United States Patent
Yoshimura et al.

(10) Patent No.: US 9,238,710 B2
(45) Date of Patent: Jan. 19, 2016

(54) POLYESTER RESIN COMPOSITION, PRODUCTION METHOD THEREOF AND LAMINATE POLYESTER FILM

(75) Inventors: Hitoshi Yoshimura, Shizuoka (JP); Shoji Aono, Shizuoka (JP); Jun Sakamoto, Shizuoka (JP); Yuzo Shimizu, Shizuoka (JP); Hiroji Kojima, Shizuoka (JP)

(73) Assignee: TORAY INDUSTRIES, INC., Tokyo (JP)

( * ) Notice: Subject to any disclaimer, the term of this patent is extended or adjusted under 35 U.S.C. 154(b) by 602 days.

(21) Appl. No.: 12/440,456

(22) PCT Filed: Sep. 5, 2007

(86) PCT No.: PCT/JP2007/067303
§ 371 (c)(1),
(2), (4) Date: Mar. 6, 2009

(87) PCT Pub. No.: WO2008/029842
PCT Pub. Date: Mar. 13, 2008

(65) Prior Publication Data
US 2010/0178524 A1    Jul. 15, 2010

(30) Foreign Application Priority Data

Sep. 6, 2006   (JP) ................. 2006-241732
Feb. 16, 2007  (JP) ................. 2007-036429
Jun. 21, 2007  (JP) ................. 2007-163338

(51) Int. Cl.
C08G 63/199   (2006.01)
B32B 27/36    (2006.01)
C08G 63/85    (2006.01)
B32B 27/08    (2006.01)
B32B 27/18    (2006.01)

(52) U.S. Cl.
CPC .............. *C08G 63/199* (2013.01); *B32B 27/08* (2013.01); *B32B 27/18* (2013.01); *B32B 27/36* (2013.01); *C08G 63/85* (2013.01); *B32B 2264/105* (2013.01); *B32B 2270/00* (2013.01); *B32B 2307/412* (2013.01); *B32B 2307/516* (2013.01); *B32B 2307/518* (2013.01); *B32B 2307/702* (2013.01); *B32B 2307/704* (2013.01); *B32B 2457/00* (2013.01); *B32B 2457/202* (2013.01); *Y10T 428/31786* (2015.04)

(58) Field of Classification Search
CPC ............ B32B 2037/702; C08G 63/85; C08G 63/199; Y10T 428/31786
USPC .................. 528/274, 275, 279, 287, 302, 307
See application file for complete search history.

(56) References Cited

U.S. PATENT DOCUMENTS

| | | | |
|---|---|---|---|
| 2,945,008 A * | 7/1960 | Caldwell et al. ................. | 528/73 |
| 5,604,019 A * | 2/1997 | Bland et al. ..................... | 428/212 |
| 6,093,787 A * | 7/2000 | Long et al. ...................... | 528/272 |
| 6,365,659 B1* | 4/2002 | Aoyama et al. ................ | 524/399 |
| 6,447,859 B2* | 9/2002 | Oguro et al. ................... | 428/35.7 |
| 2005/0239929 A1* | 10/2005 | Sakamoto et al. ............. | 524/115 |
| 2009/0223704 A1* | 9/2009 | Osada et al. ................... | 174/258 |
| 2010/0209735 A1* | 8/2010 | Yoshimura et al. ........... | 428/800 |
| 2012/0097427 A1* | 4/2012 | Osada et al. ................... | 174/250 |

FOREIGN PATENT DOCUMENTS

| | | |
|---|---|---|
| JP | 06295014 | 10/1994 |
| JP | 9506837 | 7/1997 |
| JP | 2000141567 | 5/2000 |
| JP | 2002-069165 | 3/2002 |
| JP | 2002-179781 | 6/2002 |
| JP | 2003183422 | 7/2003 |
| JP | 2004067829 | 3/2004 |
| JP | 2004067830 | 3/2004 |
| JP | 2004-143353 | 5/2004 |
| JP | 2004-175838 | 6/2004 |
| JP | 2004-224917 | 8/2004 |
| JP | 2005314643 | 11/2005 |
| JP | 2006225621 | 8/2006 |
| JP | 2007-197651 | 8/2007 |
| WO | WO9846815 | 10/1998 |
| WO | 2006/126506 | 11/2006 |
| WO | WO-2007020861 A1 * | 2/2007 |

* cited by examiner

*Primary Examiner* — Melissa Rioja
(74) *Attorney, Agent, or Firm* — Pillsbury Winthrop Shaw Pittman LLP

(57) ABSTRACT

The present invention is a composition containing a polyester resin containing at least an alicyclic dicarboxylic acid component and an alicyclic diol component, and it is a polyester resin composition which satisfies that a glass transition temperature is 65° C. or more and 90° C. or less, a refractive index at sodium D line is 1.500 or more and 1.570 or less, a titanium element content is 5 ppm or more and 500 ppm or less, a phosphorus element content is 50 ppm or more and 500 ppm or less and a gel fraction is 50% or less. By the present invention, it is possible to obtain a polyester resin composition having a low refractive index and photoelastic coefficient, and in which a thermally degraded foreign substance is reduced.

9 Claims, No Drawings

POLYESTER RESIN COMPOSITION, PRODUCTION METHOD THEREOF AND LAMINATE POLYESTER FILM

TECHNICAL FIELD

The present invention relates to a polyester resin composition having a low photoelastic coefficient, a low refractive index, and in addition, a low gel fraction, and to a production method thereof. Furthermore it relates to an optical functional polyester film.

BACKGROUND ART

In recent years, needs for optical functional film are increasing. As a concrete example of the optical functional film, for example, a light reflecting film having a high reflectance, without metal plating, by laminating layers of different refractive index in a multi-layer is mentioned. And, an optically isotropic film having a low photoelastic coefficient suitable for liquid crystal display applications can be mentioned.

For example, in Patent reference 1, a light reflecting film in which a copolymerized polyester resin composition is laminated to a polyethylene naphthalate resin composition (hereafter, PEN), and in Patent reference 2, a multi-layer optical film in which PEN and a copolymerized polyester resin composition are laminated, are proposed. However, in the polyester resin compositions described in Patent references 1 and 2, since polyesters different in Tg are laminated with each other, they are inferior in processability. Furthermore, the polyester described in Patent references 1 and 2 are high in photoelastic coefficient, and cannot be used for a liquid crystal display or the like.

As a copolymerized polyester excellent in thermal resistance which can be used for optical applications, a polyester having cyclic acetal skeleton can be mentioned. For example, in Patent references 3 and 4, at copolymerizing a dicarboxylic acid, a diol or the like having a cyclic acetal skeleton, production methods in which ester exchange reaction is carried out under a high pressure or under a nitrogen atmosphere are described. However, in said production methods, the diol having cyclic acetal skeleton cannot be reacted efficiently, and there are problems such as that, in a condensation polymerization reaction, the diol component having cyclic acetal skeleton is scattered, or a gelation occurs during the polymerization.

In Patent references 5 and 6, it is described that a polymer of which yellowness index is low and sublimate is little can be obtained by copolymerizing an alicyclic component to a polyester resin in presence of a titanium compound in an oligomerization step such as ester exchange. However, although the gelation can considerably be prevented by using the titanium compound, after producing the polyester resin, in a later step such as producing a film for a long time, since an opening or the like of the alicyclic component occurs by thermal degradation, it is insufficient as a prevention of gelation.

In addition, in case where the polyester resin composition containing a spiroglycol shown in these Patent references is used to a multi-layer laminate film constituted together with a polyethylene terephthalate (hereafter, PET) resin layer, since its glass transition temperature (hereafter, Tg) is higher than that of ordinary PET, at molding into a film, a laminate non-uniformity or the like may arise and it is inferior in processability. On the other hand, in case where the Tg is controlled approximately to that of PET by decreasing the content of spiroglycol, it is impossible to sufficiently lower its refractive index, and the light reflectance of the obtained multi-layer laminate film becomes low.

In addition, in Patent reference 7, a production method for obtaining a polyester resin in which a phosphorus-based antioxidant, etc., is compounded by blending/kneading to a polyester resin composition having a cyclic acetal skeleton is shown. However, it cannot deal well with thermal degradation during the polyester resin production, and its effect is insufficient.

[Patent reference 1]: JP-2000-141567A
[Patent reference 2]: JP-H9-506837A (national publication of translated version) (Columns 2 to 6)
[Patent reference 3]: JP-2004-67829A (Columns 1 to 9)
[Patent reference 4]: JP-2003-183422A
[Patent reference 5]: JP-2005-314643A (Columns 1 to 13)
[Patent reference 6]: JP-2006-225621A (Columns 1 to 19)
[Patent reference 7]: JP-2004-67830A (Columns 1 to 4)

DISCLOSURE OF THE INVENTION

Problem to be Solved by the Invention

The object of the present invention is to solve the above-mentioned conventional problem and to provide a polyester resin composition excellent in thermal stability, low in gel fraction, low in refractive index, and in addition, low in photoelastic coefficient, and a production method thereof. And, another object of the present invention is to provide a laminate polyester film excellent in light reflecting properties.

Means for Solving the Problem

The above-mentioned object of the present invention is achieved by a polyester resin composition, which is a composition containing a polyester resin containing at least an alicyclic dicarboxylic acid component and an alicyclic diol component, and which satisfies the following equations (1) to (5).

$$65° \text{C.} \leq \text{glass transition temperature} \leq 90° \text{C.} \quad (1)$$

$$1.500 \leq \text{refractive index at sodium D line} \leq 1.570. \quad (2)$$

$$5 \leq \text{titanium element content} \leq 500 \text{ ppm} \quad (3)$$

$$50 \leq \text{phosphorus element content} \leq 500 \text{ ppm} \quad (4)$$

$$\text{gel fraction} \leq 50\% \quad (5)$$

Here, the gel fraction is the ratio of o-chlorophenol insoluble component weight after the polyester resin composition is heat treated in condition of 285° C.×2.5 hr under the atmosphere with respect to the total weight.

In addition, the present invention is a method for producing the above-mentioned polyester resin composition, which comprises a production method of polyester resin composition comprising steps of, at producing the polyester resin by using at least an alicyclic dicarboxylic acid component and an alicyclic diol component, adding a titanium compound such that an amount of titanium element is 5 ppm or more and 500 ppm or less with respect to the polyester resin composition to be obtained, and further adding a phosphorus compound such that an amount of phosphorus element is 50 ppm or more and 500 ppm or less with respect to the polyester resin composition to be obtained.

In addition, the present invention includes a laminate polyester film in which a layer constituted with the above-mentioned polyester resin composition and a layer constituted with polyethylene terephthalate resin composition are laminated alternatively.

Effect of the Invention

By the present invention, it is possible to obtain a polyester resin composition which is low in refractive index and photoelastic coefficient, excellent in thermal stability, and low in gel fraction. And, by the production method of the present invention, it is possible to reduce gelation of the polyester resin composition.

The polyester resin composition obtained by the present invention has a low photoelastic coefficient suitable for liquid crystal display applications. And, by the present invention, it is possible to obtain a laminate polyester film excellent in light reflecting properties.

BEST MODE FOR CARRYING OUT THE INVENTION

It is necessary that the polyester resin of the present invention contains at least an alicyclic dicarboxylic acid component and an alicyclic diol component. An aromatic ring contained in polyester resin has an effect to raise Tg, but it is not preferable since it simultaneously raises refractive index and raises photoelastic coefficient. In case where the photoelastic coefficient is high, since retardation changes greatly when a stress is added to the film, it is not suitable for a liquid crystal display application.

Whereas, in the polyester resin of the present invention, by replacing the aromatic ring component with an alicyclic dicarboxylic acid component or an alicyclic diol component, the refractive index or photoelastic coefficient is decreased. As the alicyclic dicarboxylic acid component, cyclohexane dicarboxylic acid component or decalin dicarboxylic acid component or the like can be mentioned. In particular, in view of availability or polymerization reactivity, cyclohexane dicarboxylic acid component is preferable. In order to introduce cyclohexane dicarboxylic acid component into a polyester resin, cyclohexane dicarboxylic acid or ester thereof can be used as a starting material.

Whereas, in alicyclic component such as cyclohexane dicarboxylic acid component, there are cis form and trans form as the stereoisomers, but in the present invention, it is preferable that a trans form ratio is 40% or less. When the trans form ratio is high, it is not preferable since photoelastic coefficient increases. And, since the trans form has, compared to the cis form, a higher melting point, when the trans form ratio increases, it easily solidifies and precipitates at around room temperature during storage or transportation, to decrease reactivity and worsen handling properties. The trans form ratio is, preferably 35% or less, more preferably 30% or less.

In the polyester resin composition of the present invention, it is preferable to make a content of such cyclohexane dicarboxylic acid component to 5 to 80 mol % in the total dicarboxylic acid component. In case where the content is less than 5 mol %, it becomes difficult to lower refractive index. On the other hand, in case where the content exceeds 80 mol %, since Tg of the polyester resin composition becomes too low compared to PET, etc., its film formation stability to make into a laminate film is impaired. And, since composition of the polyester resin composition differs greatly from PET, etc., interlayer adhesion with PET, etc., deteriorates and a delamination becomes easy to occur, and quality of the laminate film lowers. The content of cyclohexane dicarboxylic acid component is further preferably 8 to 50 mol %.

In the present invention, when compared to an ordinary polyester, for example, PET, by replacing terephthalic acid component (aromatic ring component) with cyclohexane dicarboxylic acid or the like, refractive index or photoelastic coefficient is decreased. However, in this case, there is a problem that Tg of the obtained polyester resin lowers. Here, by replacing ethylene glycol component with an alicyclic diol component, as well as lowering the refractive index or photoelastic coefficient, Tg is raised. As a result, compared to PET, although the refractive index or photoelastic coefficient is low, a polyester resin having the same level of Tg can be obtained.

As the alicyclic diol component of the present invention, in view of high effect of raising Tg, spiroglycol component or isosorbide component is preferable. In particular, in view of color of polyester to be obtained, spiroglycol component is preferable. Here, spiroglycol means 3,9-bis(2-hydroxy-1,1-dimethyl ethyl)-2,4,8,10-tetraoxaspiro[5,5]undecane.

In the polyester resin composition of the present invention, it is preferable to make such spiroglycol component content into 5 to 80 mol % in total diol component. In case where the content is less than 5 mol %, since Tg of the polyester resin composition becomes too low compared to PET, etc., its film formation stability to make into a laminate film is impaired. On the other hand, in case where the content exceeds 80 mol %, since Tg of the polyester resin composition becomes too high compared to PET, etc., film formation stability when made into a laminate film is impaired, and, since composition of the polyester resin composition differs greatly from PET, etc. to deteriorate interlayer adhesion with PET, etc., and a delamination becomes easy to occur, and quality of the laminate film lowers. The content of spiroglycol component is further preferably 8 to 50 mol %.

In the polyester resin composition of the present invention, it is necessary that Tg is in the range of 65° C. to 90° C. In case where Tg is lower than 65° C., optical characteristics are easy to change over time due to insufficient thermal resistance. And, when it is subjected to a laminate film formation with PET, etc., since Tg difference between the laminate resins increases, a laminate nonuniformity or the like occurs, especially in stretching step, to impair film formation stability. In case where a laminate film is made with another resin, it is preferable that Tg of said another resin (Tg1) and Tg of the polyester resin composition of the present invention (Tg2) are the same, and it is preferable that |Tg1−Tg2| is 10° C. or less, further 5° C. or less.

In case where Tg exceeds 90° C., since Tg difference becomes too large when laminated with PET, etc., as mentioned above, laminate nonuniformity or the like occurs, film formation stability is impaired, and a delamination also becomes easy to occur, to worsen quality as a laminate film. It is preferable that Tg of the polyester resin composition of the present invention is in the range of 70 to 87° C., and it is further preferable to be in the range of 75 to 85° C.

Whereas, Tg of the present invention is determined by a differential scanning calorimeter (DSC7 type, produced by Perkin Elmer Co., Ltd.), after heated from 20° C. up to 285° C. at a rate of 16° C./min in nitrogen atmosphere, cooled rapidly by using liquid nitrogen, and heated again from 20° C. up to 285° C. at a rate of 16° C./min in nitrogen atmosphere. It means the Tg in the second heating process.

It is necessary that the polyester resin of the present invention has a refractive index of 1.500 to 1.570. It is impossible to make the refractive index into less than 1.500 in case of a polyester resin. On the other hand, in case where the refractive index exceeds 1.570, since refractive index difference with a laminate polymer becomes small, a light reflectance of the obtained laminate film becomes small. It is preferable that the refractive index of the polyester resin composition of the present invention is in the range of 1.510 to 1.560. Whereas, the refractive index of the present invention denotes the refractive index measured in condition of 23° C. by using sodium D line.

In the polyester resin composition of the present invention, in order to make refractive index or photoelastic coefficient low, it is preferable to make aromatic ring mole number contained in the polyester resin composition 1 kg into 4.8 mol or less. In case where it exceeds 4.8 mol, it is not preferable since the refractive index or photoelastic coefficient is apt to increase. Whereas, the aromatic ring mole number of the present invention is based on benzene ring mole number as its basic unit. The definition in the present invention is explained with reference to examples of PET and PEN.

In case of PET, since molecular weight of the basic repeating unit is 192, the basic repeating unit number per polymer 1 kg is 5.2. Since terephthalic acid component (corresponding to one benzene ring) is contained by 1 mol in the basic repeating unit, aromatic ring mole number of PET is calculated as 5.2. On the other hand, in case of PEN, molecular weight of the basic repeating unit is 242, and the basic repeating unit number per polymer 1 kg is 4.1. The naphthalene dicarboxylic acid component is contained by 1 mol in the basic repeating unit, but since naphthalene ring corresponds to 2 benzene rings, the aromatic ring mole number of PEN is calculated as 8.2 mol.

In the present invention, the polyester resin contains at least an alicyclic dicarboxylic acid component and an alicyclic diol component, but it is preferable to contain, as other dicarboxylic acid component, 20 to 95 mol % of at least one kind dicarboxylic acid component selected from 2,6-naphthalene dicarboxylic acid component, terephthalic acid component and isophthalic acid component with respect to the total dicarboxylic acid component. Regarding the other dicarboxylic acid component, as far as its characteristics are acceptable, conventionally known ones may be copolymerized. For example, aliphatic dicarboxylic acids such as adipinic acid or sebacinic acid, or esters thereof, aromatic dicarboxylic acids such as 4,4'bisphenylene dicarboxylic acid, 5-sodium sulfoisophthalic acid or diphenic acid, or esters thereof, can be mentioned.

Furthermore, as to the diol component, it is preferable to contain ethylene glycol component in 20 to 95 mol % with respect to the total diol component. In case where the abovementioned aromatic dicarboxylic acid component is less than 20 mol %, it becomes difficult to make Tg into 65° C. or more or, for example, when it is laminated with PET or PEN, interlayer adhesion with those resins decreases. Similarly, in case where ethylene glycol component is less than 20 mol %, when it is laminated with PET or PEN, interlayer adhesion with those resins decreases. On the other hand, in case where the aromatic dicarboxylic acid component exceeds 95 mol %, it becomes difficult to decrease refractive index or photoelastic coefficient. And, in case where the ethylene glycol component exceeds 95 mol %, it becomes difficult to make Tg into 65° C. or more. As other diol components, as far as its characteristics are acceptable, conventionally known ones may be copolymerized. For example, diol component such as diethylene glycol, butane diol, propane diol, polyethylene glycol or polytetramethylene glycol can be mentioned.

It is necessary that the polyester resin composition of the present invention has a gel fraction of 50% or less, preferably 45% or less, more preferably 40% or less, still more preferably 30% or less. The gel fraction is the weight ratio of o-chlorophenol insoluble matter with respect to the total weight of the polyester composition after the polyester resin composition is heat treated in condition of 285° C.×2.5 hr under the atmosphere. Detailed condition for measurement is mentioned later.

In addition, it is preferable that a gel fraction after heat treated under condition of 285° C.×2.5 hr under nitrogen is 10% or less, more preferably 8% or less, still more preferably 5% or less.

Since gel is insoluble in solvent, the ratio of o-chlorophenol insoluble matter denotes an amount of gel generated by the heat treatment. Since a polyester resin copolymerized with spiroglycol has a spiro ring, it has a characteristic to be easily decomposed by heat in acidic and water-containing condition, to cause a gelation. In case where the gel fraction exceeds 50%, it means that the polyester resin composition is very easy to cause a gelation, for example, there may cause problems such as that, when it is extruded in a strand state after a condensation polymerization, its shape becomes like a knot yarn and cannot be cut by a cutter, that, in filtration step by a filter when it is subjected to a film formation, filtering pressure abnormally increase by a large amount of gel, that surface defects of laminate film increases or that laminate thickness of multi-layer laminate film varies.

Furthermore, it is preferable that a weight loss by heat of the polyester resin composition under the atmosphere is 2% or less, and more preferably 1.5% or less. Furthermore, it is preferable that a weight loss by heat under nitrogen is 1% or less, more preferably 0.8% or less. Here, the weight loss by heat is a weight loss ratio at 300° C. of the polyester resin composition with respect to the total weight when temperature is raised from 20° C. to 400° C. (heating speed: 4° C./min) under the atmosphere and under nitrogen by a simultaneous thermogravimetric/differential thermal analysis instrument (hereafter, TG-DTA). In case where the weight loss by heat under the atmosphere exceeds 2%, or in case where the weight loss by heat under nitrogen exceeds 1%, it means, since the polyester resin composition is very poor in thermal stability, a gelation or a generation of black colored foreign substance is easy to occur.

In the present invention, in view of preventing gelation, it is preferable that the polyester resin is prepared by a condensation polymerization reaction by using a titanium compound of which reactivity is high and acidity is low. Accordingly, it is necessary that the polyester resin composition of the present invention contains 5 to 500 ppm titanium element. In case where the amount of titanium element exceeds 500 ppm, it is not preferable since gelation is accelerated due to increased amount of metal content. And, in case where the amount of titanium element is less than 5 ppm, polymerization time is delayed, as a result, due to insufficient polymerization activity, and it is not preferable since gelation is accelerated due to a long stagnation time at a high temperature. The content of titanium element is preferably 5 to 100 ppm, more preferably 5 to 70 ppm, still more preferably 10 to 50 ppm.

As catalyst for condensation polymerization, a titanium compound having at least one kind substituent group selected from alkoxy group, phenoxy group, acylate group, amino group and hydroxyl group is preferably used. A complex oxide or the like which contains titanium and silicon is not preferable for the present invention since it generates insoluble particles in the polyester in some cases.

As concrete examples of the alkoxy group, aliphatic alkoxides such as ethoxide, propoxide, isopropoxide, butoxide and 2-ethyl hexoxide, β-diketone-based functional groups such as acetyl acetone, hydroxypolyvalent carboxylic acid-based functional groups such as lactic acid, malic acid, tartaric acid, salicylic acid and citric acid, ketoester-based functional groups such as methyl acetoacetate and ethyl acetoacetate, are mentioned. Here, β-diketone-based functional group, hydroxycarboxylic acid-based functional group and ketoester-based functional group are conditions in which β-diketone compound, hydroxycarboxylic acid compound and ketoester compound coordinate with titanium, respectively. And, as phenoxy groups, phenoxy and cresylate, etc., are mentioned. And, as acylate groups, polyvalent carboxylic acid-based functional groups such as lactate, stearate, phthalic acid, trimellitic acid, trimesic acid, hemimellitic acid, pyromellitic acid, oxalic acid, malonic acid, succinic acid, glutaric acid, adipinic acid, sebacinic acid, maleic acid, fumaric acid and cyclohexane dicarboxylic acid or acid anhydrides thereof, and nitrogen-containing polyvalent carboxylic acid-based functional groups such as ethylene diamine tetraacetic acid, nitrilotripropionic acid, carboxyiminodiacetic acid, carboxymethyl iminodipropionic acid, diethylene triaminopenta acetic acid, triethylene tetraaminohexaacetic acid, iminodiacetic acid, iminodipropionic acid, hydroxyethyl iminodiacetic acid, hydroxyethyl iminodipropionic acid, methoxyethyl iminodiacetic acid, are mentioned. And, as amino groups, aniline, phenyl amine, diphenyl amine, etc., are mentioned. And, diisopropoxybisacetyl acetone or tri-ethanol aminate isopropoxide, etc., which contain 2 kinds of the above substituent group, are mentioned.

Among these, a titanium compound having at least one kind functional group selected from the group consisting of β-diketone-based functional group, hydroxycarboxylic acid-based functional group and ketoester-based functional group, is preferable as catalyst. It is because, in the titanium catalyst having these functional group, spiroglycol ring opening or gelation is hard to occur, and thermal resistance of the obtained polyester resin composition is hard to be impaired. In particular, citric acid-based functional or lactic acid-based functional group which is a hydroxycarboxylic acid-based functional group, is preferable.

In addition, it is necessary that the polyester resin composition of the present invention contains phosphorus element of 50 to 500 ppm. By containing phosphorus element of 50 to 500 ppm, thermal stability of the obtained polyester resin composition increases. In particular, since the polyester resin composition of the present invention contains alicyclic component of which thermal resistance is inferior to aromatic compound, it is necessary that the amount of phosphorus element should be larger than ordinary PET, etc. In case where the amount of phosphorus element is less than 50 ppm, thermal resistance of the obtained polyester resin composition is insufficient. In case where the amount of phosphorus element exceeds 500 ppm, since melt state resistivity of the obtained polyester resin composition increases, electro-pinnig properties at film formation may decrease and at polymerization, reactivity may also decrease. As the amount of phosphorus element, the range of 60 to 450 ppm is preferable, more preferably 70 to 400 ppm, and most preferably, it is the range of 70 to 300 ppm.

It is preferable that the phosphorus element is contained in a form of phosphorus compound. As the phosphorus compound, although it is not especially limited, for example, phosphoric acid compound, phosphrous acid compound, phosphonic acid compound, phosphinic acid compound or the like can be mentioned, and among them, ester compounds thereof are preferable in view of prevention of foreign substance formation.

It is preferable that, among the phosphorus element contained in the phosphorus compound, 50 mol % or more is trivalent phosphorus element. The phosphorus compound containing trivalent phosphorus element is excellent in preventing effect of thermal degradation, or improving effect of color tone.

As such phosphorus compounds, for example, phosphite, diaryl phosphinous acid alkyl, diaryl phosphinous acid aryl, aryl phosphonous acid dialkyl and aryl phosphonous acid diaryl can be mentioned. Concretely, triphenyl phosphite, tris(4-monononyl phenyl)phosphite, tri(mononononyl/di-nonyl.phenyl)phosphite, tris(2,4-di-tert-butyl phenyl)phosphite, monooctyl diphenyl phosphite, monodecyl diphenyl phosphite, bis[2,4-(bis1,1-dimethyl ethyl)-6-methyl phenyl] ethyl phosphite, tetrakis(2,4-di-tert-butyl phenyl) 4,4'-biphenylene diphosphite, tris(2,4-di-tert-butyl phenyl)phosphite, bis(2,6-di-tert-butyl-4-methyl phenyl)pentaerythritol-diphosphite, bis(2,4-di-tert-butyl phenyl)pentaerythritol-diphosphite, 3,9-bis(2,4-dicumyl phenoxy)-2,4,8,10-tetraoxa-3,9-diphosphaspiro[5.5]undecane, phenyl-neopentylene glycol-phosphite, 2,2-methylene bis(4,6-di-tert-butyl phenyl)octyl phosphite, bis(2,4-dicumyl phenyl)pentaerythritol diphosphite, tetra(C12 to C15 alkyl)-4,4'-isopropylidene diphenyl diphosphite, etc., can be mentioned, but not limited thereto.

The content as compound of trivalent phosphorus compound is, in view of thermal stability, it is preferable to be 0.01 to 2.0 wt % with respect to the polyester resin composition. In case where the content of the trivalent phosphorus compound is less than 0.01 wt %, the effect of thermal resistance improvement is small, and in case where it exceeds 2.0 wt %, a notable increase of effect is not exhibited and it is economically disadvantageous.

It is preferable that the polyester resin composition of the present invention contains 30 to 200 ppm of metal element selected from alkali earth metals, Zn, Mn and Co, 2 to 1000 ppm of alkali metal element, 50 to 500 ppm of phosphorus element, furthermore, it is preferable to be dissolvable in tetrahydrofuran in an amount of 2 g/liter or more. Here, the alkali earth metal means Mg, Ca, Sr and Ba.

In case where 30 to 200 ppm of the metal element selected from the alkali earth metals, Zn, Mn and Co is contained, a melt state resistivity of the polyester resin composition decreases and electro-pinning properties at film formation of the polyester resin composition is improved. In addition, since these metals function also as an ester exchange catalyst at producing the polyester resin, it is possible to increase reactivity of the polyester polymerization.

In case where the content of these elements is less than 30 ppm, melt state resistivity of the obtained polyester resin composition is high, and its electro-pinning properties may become insufficient. On the other hand, in case where these content exceeds 200 ppm, coloration of the obtained polyester resin composition becomes significant and color of a light reflection film obtained therefrom may become worse, furthermore, thermal resistance of the polyester resin composition itself is apt to deteriorate. Preferably, the range of 32 to 190 ppm, especially preferably 35 to 180 ppm is preferable. As the alkali earth metal, since Ca is apt to form a foreign substance, Mg is preferable. And, among Zn, Mn and Co, Mn is preferable in view points of foreign substance, color tone and transparency. Among them, Mg and Mn are preferable in view point of transparency of the resin, and especially, Mn is preferable.

In addition, in case where the alkali metal element is contained in an amount of 2 to 1000 ppm, gel fraction of the polyester resin composition decreases. This becomes significant by combining with a titanium compound. This is estimated that because the spiroglycol is hard to be ring opened in an alkali atmosphere.

In case where an amount of alkali metal element is less than 2 ppm, effect of decreasing the gel fraction is small. In case where an amount of alkali metal element exceeds 1000 ppm, thermal resistance of the polyester resin composition is easy to deteriorate, and a foreign substance becomes easy to be produced. The amount of alkali metal element is, preferably, in the range of 5 to 500 ppm, and especially, 10 to 200 ppm is preferable. As the alkali metal element, at least one kind selected from Li, Na and K is preferable, and in view point of color of the polyester resin, especially K is preferable.

The above-mentioned metal element may be added as an ester exchange reaction catalyst. In particular, manganese compound is preferable since its reactivity at ester exchange reaction is high. It is preferable that the metal element is added as a metal compound soluble in the polyester. Accordingly, those selected from hydroxide, chloride and acetate are preferable, and especially, acetate is preferable in view point of transparency of the polyester resin.

It is preferable that the polyester resin composition of the present invention is soluble in tetrahydrofuran (hereafter, THF) by 2 g/liter or more. Here, "soluble" means that, when the polyester resin composition 2 g is put into 1 liter THF, left at room temperature for 24 hours, filtered by a membrane filter of its opening is 1 μm, and weighed an insoluble substance left on the filter, an amount of the insoluble substance is within 2% of the polyester resin composition put.

In case where the solubility in THF is less than 2 g/liter, interlayer adhesion when laminated with PET or with other kind polymer is apt to be insufficient. In case where the solubility is 2 g/liter or more, laminate adhesion properties with PET or with other kind polymer becomes better. The reason is not sure, but it is estimated that a good affinity with the other kind organic substance is reflected to the solubility.

It is preferable that the polyester resin composition of the present invention has an inherent viscosity of the range of 0.65 to 1.0. In case where the inherent viscosity is less than 0.65, it is not preferable since the polyester resin composition becomes brittle, and in case where the inherent viscosity exceeds 1.0, since its melt viscosity increases, a precise lamination becomes difficult. It is more preferable that the inherent viscosity is in the range of 0.70 to 0.85.

It is preferable that the polyester resin composition of the present invention is amorphous. In the above-mentioned preferable composition range, the polyester resin is substantially amorphous. The "amorphous" in the present invention means that a heat of fusion by DSC determination is 4 J/g or less. Such an amorphous polyester resin composition is preferable since its optical characteristics are hard to change in a film production.

On the other hand, such an amorphous polyester resin composition is apt make a block by thermal cohesion at drying. In such cases, it is possible to prevent forming a block at drying by adding 5 to 50 wt % of a crystalline polyester resin. Here, the crystalline polyester resin refers to a resin of which heat of crystal fusion by differential scanning calorimetry determination is 4 J/g or more.

As method for including the crystalline polyester, a melt/kneading by vent type extruder is preferable. That is, it is a method for obtaining a pellet by melt/kneading the crystalline polyester and the polyester resin composition of the present invention by a vent type extruder. As the crystalline polyester, it is possible to mention polyethylene terephthalate, polybutylene terephthalate, polyethylene naphthalate or copolymer thereof, but polyethylene terephthalate is most preferable.

In addition, the polyester resin composition of the present invention may contain, as required, an inorganic particle, an organic particle, a dye, a pigment, an antistatic agent, an antioxidant, a wax, etc.

The polyester film constituted with the polyester resin composition of the present invention is low in gel fraction, low in photoelastic coefficient and refractive index and can be preferably used for liquid crystal display applications, etc.

The laminate polyester film of the present invention exhibits an excellent light reflecting properties by laminating resin layers of different refractive index in a multi-layer. In order to obtain an excellent light reflecting properties, it is preferable to laminate alternatively a layer constituted with the polyester resin composition of the present invention and a layer constituted with PET resin composition. Since the polyester resin composition of the present invention is lower in refractive index than that of PET resin composition, and since it is amorphous, the refractive index does almost not change even it is stretched. For that reason, it efficiently reflects light at the interface of the layer of polyester resin composition of the present invention and the PET layer.

As a matter of course, it is preferable that a light reflectance of the laminate polyester film is higher, but 90% or more is a preferable range as a light reflecting film. In order to achieve an excellent light reflecting properties, it is preferable to make a total laminate number into 250 layers or more.

Such a laminate film can be obtained by feeding polymers, supplied from different paths by using two extruders or more, into a multi-layer laminating apparatus. As the multi-layer laminating apparatus, a multi-manifold die, a feed block, a static mixer or the like can be mentioned. In particular, in view of accuracy of laminate thickness, it is preferable to use a multi-manifold die or a feed block. Thus laminated polymer is extruded in a sheet-like state from a die, cooled by a cooling drum or the like, and an unstretched sheet can be obtained. In order to obtain an unstretched sheet excellent in thickness uniformity and surface condition, it is preferable to rely on an electro-pinning method. The obtained unstretched sheet can successively be subjected to a uniaxial or biaxial stretching. In the biaxial stretching, a simultaneous biaxial stretching or a successive biaxial stretching can be carried out.

In case where it is stretched by a successive biaxial stretching, it is preferable that the obtained unstretched film is contacted and heated with rolls heated to (glass transition temperature Tg−30° C.) or more and (glass transition temperature Tg+50° C.) or less of the polyester, to stretch 1.1 to 4.0 times longitudinally, and after this is once cooled, stretched in width direction 1.1 to 4.0 times in a temperature atmosphere of (glass transition temperature Tg+5° C.) or more and (glass transition temperature Tg+50° C.) or less of the polyester by the edges of said film being nipped by tenter clips. If the biaxially oriented film of which stretching is finished is further heat treated at a temperature in the range of Tg+50° C. to Tg+150° C., its dimensional stability is improved.

Thus obtained polyester film is low in photoelastic coefficient, and suitable as a film for liquid crystal display. And, a film in which it is laminated alternatively with PET, etc. is excellent in light reflecting properties and suitable for reflection material applications.

The production method of the polyester resin composition of the present invention is the following method.

As production method of the polyester resin, a method in which dicarboxylic acid and diol are esterified to synthesize an oligomer, and successively this is subjected to a condensation polymerization, and a method in which dicarboxylic acid ester and diol are subjected to an ester exchange reaction to synthesize an oligomer, and successively this is subjected to a condensation polymerization, can be applied. Since spiroglycol is easy to decompose by an acid component, in case where it is used, in order to avoid its decomposition, a method in which dicarboxylic acid ester and diol are subjected to an ester exchange reaction to synthesize an oligomer, and successively this is subjected to a condensation polymerization is preferable.

In the production method of the present invention, in view point of preventing gelation, it is necessary to carry out a condensation polymerization reaction by using a titanium compound of which reactivity is high, and it is necessary to add the titanium compound such that an amount of titanium element is 5 to 500 ppm in weight with respect to the polyester resin to be obtained. In case where the amount of addition exceeds 500 ppm, it is not preferable since metal content contained increases and gelation is accelerated. And, in case where the amount of addition is less than 5 ppm, it is not preferable, since polymerization activity is insufficient, polymerization time is delayed and stagnation time at high temperature becomes long, to accelerate a gelation. The content of the titanium element is, preferably 5 to 100 ppm, more preferably 5 to 70 ppm, still more preferably 10 to 50 ppm. Kinds of preferable titanium compound are as the above-mentioned.

It is preferable that the titanium compound is added to a reaction system before starting reducing pressure in polymerization reaction vessel. In case where the titanium compound is added before reaction or during reaction for obtaining the oligomer, although gel fraction decreases, fine particles derived from the titanium compound generates, and the obtained polyester resin becomes hazy in some cases. Accordingly, it is most preferable to select, as the timing for adding the titanium compound, a timing after substantially finishing the ester exchange reaction or the esterification reaction to obtain an oligomer and before reducing pressure in the reaction vessel.

In the production method of the present invention, it is necessary to add a phosphorus compound such that an amount of phosphorus element is 50 to 500 ppm (in weight) with respect to the polyester resin composition to be obtained. As a content of the phosphorus element, the range of 60 to 450 ppm is preferable, more preferably in the range of 70 to 400 ppm, furthermore, the range of 70 to 300 ppm is most preferable.

In case where a content of the phosphorus compound is less than 50 ppm as amount of phosphorus element, quality decreases such that a thermally degraded foreign substance generates during polymerization, or the polyester resin composition to be obtained is colored. On the other hand, in case where a content of the phosphorus compound exceeds 500 ppm as amount of phosphorus element, a notable effect is not exhibited in improvement of thermal stability or in improvement of color tone.

As to the timing of adding the phosphorus compound, it is preferable to be, after finishing the esterification reaction or ester exchange reaction, between starting reducing pressure of polymerization reaction vessel and reaching a predetermined degree of polymerization of the polyester.

When phosphorus compound is added after starting reducing pressure in the polymerization reaction vessel in this way, the polymerization can be carried out without causing a serious deactivation of the polymerization catalyst, and it is possible to produce a polyester resin composition excellent in thermal stability and good in color tone.

It was conventionally known to add a phosphorus compound in the polymerization reaction vessel before starting pressure reduction, but a large amount of phosphorus compound cannot be added since it causes deactivation of the polymerization catalyst, and as a result, it was difficult to obtain a polyester resin composition excellent in thermal stability or color tone. And, in case where the phosphorus compound is added to the polyester resin after finishing polymerization, generation of thermally degraded foreign substance during the polymerization could not be prevented. In particular, in case where the polyester is polymerized by a batch polymerization, since the following batch polymerization is carried out in a condition where a part of previous batch polymer is left in the reaction vessel, a prevention of thermally degraded foreign substance during the polymerization affects greatly to the polymer quality of the following batch or after.

Since the polyester resin composition of the present invention contains alicyclic dicarboxylic acid component and alicyclic diol component which are thermally weak than aromatic component, the above-mentioned addition method of the phosphorus compound is preferable. By this embodiment, it becomes possible to produce an alicyclic component containing polyester resin composition which has a better thermal stability or color tone than by a conventional production method.

The phosphorus compound may, of course, be added other than the above-mentioned timing of addition. For example, before starting pressure reduction in the polymerization reaction vessel, the phosphorus compound of an amount which does not cause deactivation of the polymerization catalyst may be added. However, in this case, too, it is preferable to add 50 ppm or more of phosphorus compound as an amount of phosphorus element, after starting pressure reduction in the polymerization reaction vessel and before finishing polymerization.

It is more preferable that the timing of addition of the phosphorus compound is a timing in which increased torque value of stirring of the polymerization reaction vessel is 50 to 95% of target value of increased torque for finishing the polymerization. Whereas, the increased torque value of stirring is increased value of stirring torque based on the stirring torque at start of the polymerization. Accordingly, in case where the stirring torque at start of polymerization is 1, and the target torque for finishing polymerization is 2, the target value of increased torque for finishing polymerization is 1. If stirring torque is 1.8 when phosphorus compound is added, since increased torque value when the phosphorus compound is added is 0.8, and it is considered that the phosphorus compound is added at a timing at which the target value of increased torque for finishing polymerization is 80%. When the phosphorus compound is added at a timing of increased torque value of stirring of less than 50%, the following polymerization reaction may be delayed. On the other hand, when it is added at a timing of increased torque value of stirring exceeding 95%, the polymerization may finish before the phosphorus compound is sufficiently mixed with the polymerization reaction system. Preferably, it is preferable that the phosphorus compound is added at a timing in which the target value of increased torque for finishing polymerization is 70 to 90%.

In the present invention, the phosphorus compound may be added at one time, or may be added by dividing into plural times. And, the phosphorus compound may be added alone, or may be added by diluting with a diol which is a polymerization material. It is preferable that the phosphorus compound is added alone, since when a large amount of material diol is added, molecular weight of the polyester resin during polymerization decreases.

At adding the phosphorus compound, the phosphorus compound may be filled in an appropriate container to be added together with the container in the polymerization reaction vessel. In such a case, as the container, it is preferable to use a bottle, of which composition is similar to that of the polyester to be polymerized, such as a PET bottle.

In addition, at adding the phosphorus compound in the polymerization reaction vessel, it is preferable to add while keeping a reduced pressure condition in the polymerization vessel. In order to that, a method for adding the phosphorus compound in the reaction vessel in which the container filled with the phosphorus compound is stored in a box for addition capable of reducing pressure, the pressure in said box is made approximately to the same as that of the reaction vessel, and a valve separating said box and the reaction vessel is opened, is preferable.

In the present invention, as the above-mentioned, it is preferable that, among the phosphorus element contained in the phosphorus compound, 50 mol % or more is a trivalent phosphorus element. The phosphorus compound containing trivalent phosphorus has also a big effect for preventing thermal degradation or improving color tone of the polyester resin during polymerization. As such phosphorus compounds, the above-mentioned phosphorus compounds can be mentioned.

As a method for addition of such trivalent phosphorus compound, it is added after the esterification or the ester exchange reaction and before the condensation polymerization reaction as the above-mentioned, but if it is added in a too much amount at that timing, it deactivates the polymerization catalyst. Accordingly, in addition to before the condensation polymerization reaction, after finalizing the condensation polymerization reaction, it is also possible to further knead the trivalent phosphorus compound into the polyester resin composition by a kneader. As methods for mixing/kneading the trivalent phosphorus compound into the polyester resin composition, it is preferable to mix by various known methods, for example, after mixing by a Henschel mixer, a V-blender, a ribbon blender, a tumbler blender, etc., to melt/knead by an extruder having a screw.

In the present invention, in view of preventing thermal degradation and coloring during polymerization of the polyester resin, it is preferable that the polymerization is carried out at as low temperature as possible, as 260 to 290° C. The polymerization temperature is the final constant temperature where temperature is gradually raised, generally, from 230 to 240° C., and after arriving at a target temperature, the condensation polymerization is carried out at the constant temperature. In case it is higher than 290° C., polymerization is accelerated, but a thermal degradation is apt to occur, and in case where it is lower than 260° C., polymerization activity decreases, and it is not preferable since, due to delayed polymerization time, a thermal degradation is apt to occur. The polymerization temperature is more preferably, 270 to 288° C., still more preferably 275 to 285° C.

At carrying out the ester exchange reaction, it is preferable that, as an ester exchange reaction catalyst, at least one kind metal compound selected from the group consisting of alkali earth metals, Zn, Co and Mn, is added such that an amount of metal element is 30 to 200 ppm with respect to the polyester resin to be obtained. Here, the alkali earth metal means Mg, Ca, Sr and Ba. In case where the amount of addition exceeds 200 ppm, since metal amount added increases, the polyester resin to be obtained is apt to be inferior in thermal resistance, and a gelation or black colored foreign substance generation is apt to be accelerated. On the other hand, in case where the amount of addition is less than 30 ppm, the ester exchange reaction may not finish sufficiently, or the reaction time may be delayed. The amount of addition is, preferably 32 to 190 ppm, more preferably 35 to 180 ppm.

Whereas, among the alkali earth metals, since Ca is apt to generate a foreign substance, Mg is better. Among Zn, Co and Mn, Mn is better in view of foreign substance or color tone. In view point of transparency of the resin, Mn is especially preferable.

As the above-mentioned metal compound, those soluble in the polyester are preferable, hydroxide or chloride, acetate are preferable, especially acetate is preferable.

Since, in the alicyclic component, especially in spiroglycol, functional group increases by water or acid, to broaden molecular weight distribution during reaction or to accelerate gelation, in order to make the reaction system into an alkaline region, it is preferable that, in a step prior to the condensation polymerization reaction, alkali metal compound is added such that an amount of alkali metal element is 2 to 1000 ppm with respect to the polyester resin composition to be obtained. By this way, it becomes possible to prevent decomposition of spiroglycol which is an alicyclic diol component, and a gelation can be prevented in the reaction step. Furthermore, since said copolymerized component reacts sufficiently, a scattering to outside the system can be prevented.

The timing of addition of the alkali metal compound may be any one of steps of before the ester exchange reaction, after the ester exchange reaction and before the condensation polymerization reaction. In particular, since spiroglycol is added before the ester exchange reaction, and among the alkali metal compounds, and there are compounds having a function of ester exchange reaction catalyst, it is preferable that the timing of addition of the alkali metal compound is before the ester exchange reaction.

When the amount of addition of the alkali metal element exceeds 1000 ppm, condensation polymerization reactivity decreases, and the polyester is apt to become hazy. Furthermore, it is not preferable since, due to decomposition of ester bond, decrease of molecular weight and gelation occur to decrease mechanical characteristics. On the other hand, when the amount of addition of the alkali metal element is less than 2 ppm, it is not preferable since gelation is apt to be accelerated during the condensation polymerization reaction, furthermore, a thick-and-thin may occur in extruded gut after the reaction, or when the obtained polyester is molded, due to the generation of acceleration of the gelation, a defective molding or decrease of physical characteristics may occur. Accordingly, the amount of the alkali metal element is, preferably 5 to 500 ppm, more preferably 10 to 200 ppm. In the production method of the present invention, preferable alkali metal element is as the above-mentioned.

Next, an example of production method of the polyester resin of the present invention is explained in detail.

Since spiroglycol is easy to be decomposed by an acid or water, the method in which dicarboxylic acid alkyl ester and diol are subjected to an ester exchange reaction to synthesize an oligomer, and then this is condensation polymerized, is applied.

As starting materials, dimethyl terephthalate, cyclohexane dicarboxylic acid dimethylester, ethylene glycol and spiroglycol are put into a reaction apparatus such that a predetermined polyester composition is obtained. At this time, by adding glycol component in an amount of 1.6 to 2.5 mol times with respect to total dicarboxylic acid component, reactivity is improved.

Into the polyester consisting of the above-mentioned materials, a metal compound such as manganese acetate.tetrahydrate is added as an ester exchange reaction catalyst, and an alkali metal element compound such as potassium hydroxide is added, and heated. At approximately 150° C., the materials turns to a homogeneous molten liquid. Subsequently, methanol is distilled off while inside the reaction vessel is gradually heated up to 235° C. in 4 hours, to carry out an ester exchange reaction.

After finishing the ester exchange reaction in such a way, as a deactivation agent of the ester exchange reaction catalyst, trimethyl phosphate, triethyl phosphonoacetate or a trivalent phosphorus compound is added. Successively, after excessive ethylene glycol is distilled off, as a condensation polymerization reaction catalyst, a titanium compound such as citric acid chelate titanium compound or tetra-n-butyl titanate is added. After that, the reactant is put into a condensation polymerization reaction apparatus of 235° C. and inside temperature is gradually raised up to 285° C. in 1.5 hours, and simultaneously with the heating, the inside pressure is reduced from normal pressure to 133 Pa or less in 2 hours. As the condensation polymerization reaction progresses, viscosity of the reactant increases. The condensation polymerization reaction is finished referring to stirring torque as an index of inherent viscosity, the polyester is discharged through a discharge die opening of the condensation polymerization apparatus into a water bath. The discharged polyester was cooled rapidly and made into a chip by a cutter.

By such a production method of polyester, the polyester resin composition of the present invention can be obtained, but the above-mentioned is an example, and the monomer, the catalyst and the condensation polymerization condition are not limited thereto.

EXAMPLES

Hereafter, the present invention is explained in more detail with reference to examples. Whereas, determination method of the physical characteristics and evaluation method of the effects were carried out by the following methods.

(1) Thermal Characteristics of Polyester (Glass Transition Temperature and Heat of Crystal Fusion)

Approximately 10 mg of a sample to be measured is weighed, sealed by using an aluminum pan and pan cover, and measured by a differential scanning calorimeter (model DSC7, produced by Perkin Elmer Co.). In the measurement, after it was heated in nitrogen atmosphere from 20° C. to 285° C. at a rate of 16° C./min, cooled rapidly by using liquid nitrogen, and heated again in nitrogen atmosphere from 20° C. to 285° C. at a rate of 16° C./min. The glass transition temperature was measured in the second heating step.

In addition, the heat of crystal fusion was calculated from the peak area of heat of crystal fusion appeared in the second heating step.

Whereas, in case where 2 batches of polymerization were carried out continuously, polymers of the 2 batches were blended after finishing the polymerization and a sample of approximately 10 mg was weighed therefrom.

(2) Refractive Index of Polyester

By melt-extruding polyester resin composition, an unstretched sheet of 100 μm thickness is obtained. Successively, refractive index was measured by "Abbe type refractive index meter NAR-4T" produced by Atago Co., Ltd., using sodium D line as a light source, at temperature condition of 23° C. Whereas, in case where 2 batches of polymerization were carried out continuously, polymers of the 2 batches were blended after finishing the polymerization and a sample for measurement was obtained therefrom.

(3) Inherent Viscosity

A polymer to be measured is dissolved in o-chlorophenol (hereafter, OCP) as solvent, at a concentration of 0.1 g/10 ml, and viscosity of the solution was measured at 25° C. by using an Oswald viscometer. Inherent viscosity was calculated by the following equation. Whereas, in case where 2 batches of polymerization were carried out continuously, polymers of the 2 batches were blended after finishing the polymerization and a sample for measurement was obtained therefrom.

$$\eta_{sp}/C = [\eta] + K[\eta]^2 \cdot C$$

Here,
$\eta_{sp}$ = (solution viscosity/solvent viscosity) − 1
C is polymer weight (g/100 ml) per solvent 100 ml
K is Haggins constant (0.343)

(4) Gel Fraction

A polyester resin composition is subjected to freeze grinding to make into a powder of a diameter of 300 μm or less, and vacuum dried. This sample 1 g was heat treated in an oven under the atmosphere or under nitrogen, at 285° C. for 2.5 hours. This is dissolved in 50 ml OCP, at a temperature of 160° C. for 40 minutes. Successively, it was filtered by a Buchner type glass filter (maximum fine opening size 20 to 30 μm), washed and vacuum dried. By an increased portion of the filter weight before and after the filtration, the weight of OCP insoluble matter left on the filter is calculated. A weight fraction of the calculated OCP insoluble matter with respect to the polyester resin composition weight (1 g), which is the sample, is determined and it is taken as the gel fraction (%). Whereas, in case where 2 batches of polymerization were carried out continuously, polymers of the 2 batches were blended after finishing the polymerization and a sample for measurement was obtained therefrom.

(5) Cis, Trans form Ratio of Cyclohexane Dicarboxylic Acid and Decalin Dicarboxylic Acid A sample was diluted 5 to 6 times by methanol, and the diluted solution 0.4 μl was subjected to a measurement by a liquid chromatography in the following condition, and from its peak area, cis form, trans form ratio was determined.

Instrument: LC-10ADvp produced by Shimadzu
Column: Capillary column DB-17 (length 30 m, inner diameter 0.32 mm, film thickness 0.25 μm) produced by Agilent Technologies Co.
Heating condition: initial temperature 110° C., temperature rise time 25 minutes, heating speed 6° C./min, final temperature 200° C.

(6) Photoelastic Coefficient ($\times 10^{-12}$ Pa$^{-1}$)

A sample of short side 1 cm and long side 7 cm was cut out. A thickness of this sample is taken as d (μm). This sample was nipped by chucks at the top and bottom by 1 cm, respectively, by using Transducer U3C1-5K produced by Shimadzu Corp., and loaded a tension (F) of 1 kg/mm$^2$ ($9.81 \times 10^6$ Pa) in the long side direction. Under this condition, phase difference R (nm) was measured by using polarizing microscope 5892 produced by Nikon Corp. As the light source, sodium D line (589 nm) was used. These numerical values were applied to "photoelastic coefficient = R/(d×F)" and photoelastic coefficients were calculated. A case of which photoelastic coefficient was less than $100 \times 10^{-12}$ Pa$^{-1}$ was taken as passing.

(7) Reflection

Spectrophotometer (U-3410 Spectrophotometer) produced by Hitachi, Ltd. was equipped with a 60 mm diameter integrating sphere 130-0632 (Hitachi, Ltd) and a 10° inclined spacer, and peak value of reflectance was measured. Whereas, the band parameter was set at 2/servo, the gain was set at 3, and the measurement was carried out at a detection speed of 120 nm/min. in a range of 187 nm to 2600 nm. And, for standardization of reflectance, an accessory BaSO$_4$ plate was used as a standard reflection plate. Whereas, since in this evaluation method, the reflectance is a relative reflectance, and it is 100% or more in some cases.

(8) Delamination Property

The test was carried out in accordance with JIS K5600 (2002). Whereas, a film is taken as a hard material and it was cross-cut into a grid pattern of 25 square grid at 2 mm interval. And, a tape cut into approximately 75 mm length was bonded to the grid portion and it was peeled off at an angle of approximately 60° in 0.5 to 1.0 seconds. Here, as the tape, Cellotape (trademark) No. 252 (width 18 mm) produced by Sekisui Chemical Co. was used. Result of evaluation was expressed by the number of entire grid piece completely peeled off. And, in case where a thickness of the test film is less than 100 μm, a sample in which the test film was firmly bonded to a biaxially stretched PET film ("Lumirror" (trademark) T60 produced by Toray Industries, Inc.) of 100 μm thickness was provided to the delamination test. In this case, the test was carried out by cutting the surface of the test sample such that the cutting does not penetrate through the test sample. When the number of peeled off grid pieces were 4 pieces or less, it was taken as passing.

(9) Thermally Degraded Foreign Substance 2 batches of condensation polymerization of the same level polyester were carried out continuously, and the polymer of the second batch was taken out in a gut state into a water bath, and 10 minutes after starting pelletizing by cutting, 1 kg polyester chip was taken out and number of black colored foreign substance of its size is 1 mm or more contained therein was visually counted. Whereas, length of short side of the smallest rectangle circumscribing the foreign substance was taken as the size of the black colored foreign substance.

Case where number of black colored foreign substance is 0 to 3/kg (polymer) or less . . . A Case where number of black colored foreign substance is 4 to 9/kg (polymer) . . . B Case where number of black colored foreign substance is 10/kg (polymer) or more . . . C Whereas, when a black colored foreign substance of which size is 5 mm or more was observed, it was taken as C regardless of the number of foreign substance.

(10) Content of Metal Element and Phosphorus Element in Polyester Resin Composition By using X ray fluorescence instrument (model MESA-500W) produced by Horiba, Ltd., intensity of fluorescent X ray of polyester was measured. Whereas, the value was converted into the contents of metal element and phosphorus element by using calibration curves prepared by samples of which contents were known.

In addition, regarding analysis of content of alkali metal element, absorbance of polymer was measured by atomic absorption spectrophotometer (model AA-6300) produced by Shimadzu Corp. Whereas, the value was converted into a metal content by using a calibration curve prepared by samples of which contents were known.

(11) Color Tone of Polyester

By using color meter (SM color computer model SM-T45 produced by Suga test instruments Co., Ltd), polyester chip was measured as Hunter value (L, b value). Whereas, in case where 2 batches of polymerization were carried out continuously, polymers of the 2 batches were blended after finishing the polymerization and a sample for measurement was obtained therefrom.

(12) Haze Value of Polymer

Polyester chip 2 g was dissolved in o-chlorophenol 20 ml, and by using quartz cell of optical path length 20 mm and haze meter (model HGM-2DP produced by Suga instruments Co., Ltd), haze value of the solution was measured by integrating sphere photoelectric photometry. Whereas, in case where 2 batches of polymerization were carried out continuously, polymers of the 2 batches were blended after finishing the polymerization and a sample for measurement was obtained therefrom.

(13) Weight Loss of Polyester by Heat

Approximately 10 mg of sample to be measured was weighed, put into an aluminum pan, and after vacuum dried at 60° C. for 24 hours, the sample weight was measured again, and a weight loss was measured by a simultaneous thermogravimetric/differential thermal analysis instrument (model TG/DTA6200 produced by Seiko Instruments Inc.) by using an aluminum pan. At the measurement, ratio of weight loss at 300° C., when heated from 20° C. to 400° C. at a rate of 10° C./min under the atmosphere or under nitrogen, with respect to the weight of entire sample was determined, and it was taken as the weight loss by heat (%).

(14) Solubility of Polyester in Tetrahydrofuran

Polyester chip 2 g is put into 1 liter tetrahydrofuran and left for 24 hours at room temperature. After that, it was filtered by a membrane filter of its opening is 1 μm (U010z produced by Nihon Poll Ltd), and the insoluble substance left on the filter is weighed. When an amount of the insoluble substance is within 2% of the chip put, that is, 0.04 g or less, it was decided as dissolved.

Synthetic Method of Catalyst

Reference Example 1

Titanium Catalyst A. Synthetic Method of Citric Acid Chelate titanium Compound

Warm water (371 g) and citric acid.monohydrate (532 g, 2.52 mol) were put into 3 liter flask equipped with a stirrer, a condenser and a thermometer, dissolved and stirred. To this solution which is being stirred, titanium tetraisopropoxide (284 g, 1.0 mol) was gradually added from a dropping funnel. This mixture was heated and refluxed for one hour to obtain a turbid solution. From the obtained solution, isopropanol/water mixture was distilled and removed under reduced pressure. The residual solution was cooled to a temperature lower than 70° C., and while being stirred, 32 wt % NaOH aqueous solution 380 g was gradually added thereto from a dropping funnel. The obtained product was filtered, successively mixed with ethylene glycol (504 g, 8.1 mol), and heated under vacuum to remove isopropanol/water, and obtained a slightly turbid light yellow product (Ti content 3.85 wt %).

Reference Example 2

Titanium Catalyst B. Synthetic Method of Lactic Acid Chelate Titanium Compound

Titanium tetraisopropoxide (284 g, 1.0 mol) was put in 2 liter flask equipped with a stirrer, a condenser and a thermometer and ethylene glycol (218 g, 3.51 mol) was added thereto from a dropping funnel while being stirred. The adding speed was controlled such that the heat of reaction heats the flask content to approximately 50° C. The obtained reaction mixture was stirred for 15 minutes and 85 wt % lactic acid ammonium aqueous solution 252 g was added thereto, to obtain a transparent light yellow product (Ti content 6.54 wt %).

Reference Example 3

Titanium Catalyst C. Synthetic Method of Titanium Alkoxides Compound

Titanium tetraisopropoxide (284 g, 1.0 mol) was put into 2 liter flask equipped with a stirrer, a condenser and a thermometer, and ethylene glycol (496 g, 8.0 mol) was added thereto from a dropping funnel, while being stirred. The adding speed was controlled such that the heat of reaction heats the flask content to approximately 50° C. 32 wt % NaOH aqueous solution 125 g was gradually added to the obtained reaction mixture from a dropping funnel, to obtain a transparent yellow liquid (Ti content 5.2 wt %).

Example 1

Synthesis of Polyester 67.6 parts by weight of dimethyl terephthalate, 17.4 parts by weight of 1,4-cyclohexane dicarboxylic acid dimethylester of which cis/trans form ratio is 75/25, 54 parts by weight of ethylene glycol, 20 parts by weight of spiroglycol, 0.04 parts by weight of manganese acetate tetrahydrate, and titanium catalyst A of which amount of titanium atom is 10 ppm with respect to the polyester to be obtained, were weighed respectively, and put into an ester exchange reaction apparatus. The content was melted at 150° C. and stirred.

Methanol was distilled off while stirring and while gradually raising temperature of the reaction content to 235° C. After predetermined amount of methanol was distilled off, ethylene glycol solution containing 0.02 parts by weight of trimethyl phosphate, and 0.05 parts by weight of bis(2,6-di-tert-butyl-4-methyl phenyl)pentaerythritol-di-phosphite (produced by Asahi Denka Co.) were added. After adding the trimethyl phosphate, the content was stirred for 10 minutes to finish an ester exchange reaction. After that, the ester exchanged reactant was moved to an polymerization apparatus.

Successively, pressure was reduced and temperature was raised while stirring the content of the polymerization apparatus, and polymerization was carried out while distilling off ethylene glycol. Whereas, pressure was reduced in 90 minutes from normal pressure to 133 Pa or less and temperature was raised in 90 minutes from 235° C. to 270° C. During the polymerization, insufficient degree of vacuum or the like accompanied by scattering of spiroglycol did not occur, especially.

When stirring torque of the polymerization apparatus reached to a predetermined value, inside of the polymerization apparatus was returned to normal pressure by nitrogen gas, and the polymer was extruded in a gut state into a water bath by opening a valve at the bottom of the polymerization apparatus. The polyester gut cooled in the water bath was cut by a cutter, to make into a chip.

In such a way, Polyester A was obtained. Inherent viscosity of the obtained Polyester A was 0.78, gel fraction under the atmosphere was 20%, and it is easily dissolved in THF.

A PET resin was polymerized in the same way as the above-mentioned except using 100 parts by weight of dimethyl terephthalate as the dicarboxylic acid component and 64 parts by weight of ethylene glycol as diol component. Inherent viscosity of the obtained PET resin was 0.65 and Tg was 80° C., and a peak of heat of crystal fusion was not observed.

Film Formation of Monolayer Biaxially Stretched Film

Polyester chip A was vacuum dried, but since it was partially cohered into block, it was unblocked and supplied to an extruder. The polyester supplied to the extruder was melted at 280° C. and after filtered by a metal nonwoven filter, it was extruded as a molten sheet from a T die. The molten sheet was cooled and solidified, by a electro-pinning method (tungsten wire of 0.15 mm diameter was used as electrode), on a mirror surface drum of which surface temperature was controlled to 25° C., and turned into an unstretched sheet. A photoelastic coefficient was determined by using said unstretched sheet.

The photoelastic coefficient was $85 \times 10^{-12}$ $Pa^{-1}$.

(Film Formation of Laminate Polyester Film)

After the above-mentioned Polyester A and the PET resin were vacuum dried, respectively, they were fed to 2 extruders, respectively. Polyester A and the PET resin were melted in an extruder at 280° C., respectively, and after passing through gear pumps and filters, joined in a feed block of 101 layers. At this time, both surfaces of the laminate film was prepared with the PET resin layer, and they were laminated alternatively such that Polyester A layer/PET resin layer was ½ in the laminate thickness. That is, they were laminated alternatively such that Polyester A layer was 50 layers and the PET layer was 51 layers.

Thus obtained laminate constituted with 101 layers was fed to a die, extruded as a sheet, and by a electro-pinning method (DC voltage 8 kV), cooled rapidly and solidified on a casting drum of its surface temperature was maintained at 25° C.

The obtained cast film was introduced to a roll type longitudinal stretching machine, heated by hot rolls of 90° C., and stretched longitudinally 3 times between rolls of different peripheral speed. The film of which longitudinal stretching was finished was introduced to a tenter type transverse stretching machine. The film was preheated in the tenter by a hot air of 100° C., and stretched transversely 3.3 times. The stretched film was heat treated in the tenter as it was by a hot air of 200° C. In this way, a film of 50 μm thickness could be obtained. Characteristics of the obtained film are shown in Table 1. The polyester resin composition of the present invention had a photoelastic coefficient of less than 100, and since its refractive index was also low, it had an excellent light reflecting properties when made into a laminate film.

Examples 2 to 3

A polyester was polymerized in the same way as Example 1 except changing the amount of dimethyl terephthalate, 1,4-cyclohexane dicarboxylic acid dimethylester, ethylene glycol and spiroglycol, and the kind of titanium catalyst as shown in Table 1. In the obtained polyester resin composition, a peak of heat of crystal fusion was not observed. Furthermore, by using the PET resin polymerized in Example 1, a laminate film was obtained in the same condition. Results are shown in Table 1. In Examples 2 and 3, since Tg differs from PET by 10° C. or more, respectively, a slight unevenness occurred when the laminate film was biaxially stretched, but since they were in the range of the present invention, they showed satisfactory characteristics.

Examples 4 to 7

A polyester was polymerized in the same way as Example 1 except changing the amount of dimethyl terephthalate, 1,4-cyclohexane dicarboxylic acid dimethylester, ethylene glycol and spiroglycol as shown in Table 1. In the obtained polyester resin composition, a peak of heat of crystal fusion was not observed. Furthermore, by using the PET resin polymerized in Example 1, a laminate film was obtained in the same condition.

Results are shown in Table 1. Although Example 4 also showed satisfactory characteristics, since the mole number of aromatic ring was large, photoelastic coefficient slightly increased. And, Example 5 showed an excellent light reflecting properties since the refractive index was sufficiently low, but since amount of alicyclic dicarboxylic acid component and alicyclic diol component increased, the compatibility with PET decreased and interlayer delamination property turned poor. In Example 6, the inherent viscosity was 0.65, a slight unevenness was observed in lamination properties at film formation and the reflectance was not high for the refractive index. In Example 7, since the inherent viscosity was high as 0.95, a slight unevenness was observed in lamination properties at the film formation and the reflectance was not high for the refractive index.

Example 8

A laminate polyester film was formed in the same way using Polyester A and the PET resin used in Example 1, except changing the total laminate number to 251 layers. The thickness of the obtained laminate polyester film was 50 μm. Results are shown in Table 1. Since laminate number increased from 101 layers of Example 1 to 251 layers, light reflection layer increased to exhibit an excellent light reflecting properties.

Example 9

A polyester film was obtained in the same way as Example 1, except using 1,4-cyclohexane dicarboxylic acid dimethylester of which cis/trans ratio of 1,4-cyclohexane dicarboxylic acid dimethylester was 50/50. Results are shown in Table 1. Compared to Example 1, since the trans ratio of 1,4-cyclohexane dicarboxylic acid dimethylester was high, the photoelastic coefficient became to a higher value than Example 1. Whereas, a peak of crystal fusion of said polymer was not observed.

Examples 10 to 13

A polyester resin, a monolayer film and a laminate film were obtained in the same way as Example 1, except changing the amount of addition of Titanium catalyst A, which is a polymerization catalyst, as shown in Table 1, and changing the timing of addition to after the addition of phosphorus compound. The amount of gel under the atmosphere increased in response to the amount of titanium element. And, in Example 10 of which amount of titanium element was 5 ppm, polymerization took a long time. Results are shown in Table 1.

Example 14

A polymerization was carried out in the same way as Example 10, except changing the amount of phosphorus element contained in the polyester to 50 ppm by changing only the amount of addition of bis(2,6-di-tert-butyl-4methyl phenyl) pentaerythritol-di-phosphite) produced by Asahi Denka Co. Since the amount of phosphorus element was small, the gel fraction under the atmosphere was a relatively high value. Accordingly, laminate accuracy of the laminate film was low and light reflecting properties slightly decreased. Results are shown in Table 1.

Example 15

A polymerization was carried out in the same way as Example 10, except changing the amount of phosphorus element to 500 ppm and the amount of titanium element to 65 ppm, contained in the polyester, by changing only the amount of addition of bis(2,6-di-tert-butyl-4-methyl phenyl)pentaerythritol-di-phosphite) produced by Asahi Denka Co. Since the amount of phosphorus element was large, reactivity of the titanium catalyst decreased and a slight decrease of degree of vacuum during polymerization was recognized. Other characteristics are shown in Table 1.

Example 16

A polymerization was carried out in the same way as Example 13 to obtain a film, except using Titanium catalyst A corresponding to 45 ppm titanium element as an ester exchange catalyst and without adding a titanium catalyst as polymerization catalyst.

In case where the titanium catalyst was used as an ester exchange catalyst, the gel fraction under the atmosphere was apt to be reduced compared to Example 13, but the turbidity of the obtained polyester resin composition was higher than Example 13, and the reflectance of the obtained laminate film was also slightly lower than Example 13.

Comparative Example 1

A polyester was polymerized to obtain a laminate film in the same way as Example 1, except copolymerizing 15 mol % of isophthalic acid instead of cyclohexane dicarboxylic acid component, without copolymerizing spiroglycol, using 0.02 wt % of ordinary antimony trioxide as a condensation polymerization catalyst and carrying out polymerization at 285° C. Results are shown in Table 1, but since any one of alicyclic dicarboxylic acid component and alicyclic diol component was not contained, the refractive index and photoelastic coefficient were high, and the reflectance of the laminate film was also low. Whereas, the polyester resin polymerized had no solubility in THF.

Comparative Example 2

A polyester was polymerized to obtain a laminate film in the same way as Example 1, except without copolymerizing cyclohexane dicarboxylic acid component, copolymerizing 30 mol % of cyclohexanone dimethanol component instead of spiroglycol, using 0.02 wt % of ordinary antimony trioxide as a condensation polymerization catalyst and carrying out polymerization at 285° C. Results are shown in Table 1, but although refractive index decreased, the photoelastic coefficient was slightly high and the reflectance of the laminate film was also slightly inferior. Whereas, the polyester resin polymerized had no solubility in THF.

Comparative Example 3

A polyester was polymerized to obtain a laminate film in the same way as Example 1, except without copolymerizing cyclohexane dicarboxylic acid component, copolymerizing 45 mol % of spiroglycol component, using 0.02 wt % of ordinary antimony trioxide as a condensation polymerization catalyst and carrying out polymerization at 285° C. Results are shown in Table 1, but the Tg and the gel fraction were very high, and the delamination property of the laminate film was also poor. And, during the condensation polymerization, the amount of scattering of low molecular weight substance was large and vacuum pipe was clogged a little bit, to cause an insufficient degree of vacuum. Whereas, the polyester resin polymerized had no solubility in THF.

Comparative Example 4

A polyester was polymerized to obtain a laminate film in the same way as Example 1, except copolymerizing 25 mol % of cyclohexane dicarboxylic acid component, without copolymerizing spiroglycol, using 0.02 wt % of ordinary antimony trioxide as a condensation polymerization catalyst and carrying out polymerization at 285° C. Results are shown in Table 1, but, although the refractive index was in a target range, Tg decreased, the delamination property of laminate film was inferior and the reflectance was also low. And, during the condensation polymerization, amount of scattering of low molecular weight substance was large and vacuum pipe was clogged a little bit, to cause an insufficient degree of vacuum. Whereas, the polyester resin polymerized had no solubility in THF.

Comparative Example 5

A polyester resin was polymerized in the same way as Example 10, except adding the titanium catalyst in an amount of 510 ppm as titanium atom. However, since the amount of titanium atom was too large, the spiroglycol gelled and a pelletizing became difficult. And, since said polymer gelled, it couldn't be melt-formed into a film, and film characteristics including refractive index could not be measured. And, said polymer was insoluble in both of OCP and THF, an inherent viscosity also could not be determined.

Comparative Example 6

A polyester resin was polymerized in the same way as Example 10, except adding the titanium catalyst in an amount of 3 ppm as titanium atom. However, since the amount of titanium atom was too small, the polymerization reach a ceiling and did not reach a predetermined torque. Furthermore, during the condensation polymerization, amount of scattering of low molecular weight substance was large and vacuum pipe was clogged, to cause an insufficient degree of vacuum. Therefore, at the time of reaching the ceiling, the polymer was taken out from the polymerization vessel. The inherent viscosity of the obtained polymer was low, and although a sheet formation was tried, the polymer was very brittle and an evaluation could not be carried out.

Comparative Examples 7 and 8

A polymer was polymerized in the same way as Example 10, except changing the amount of bis(2,6-di-tert-butyl-4-methyl phenyl) pentaerythritol-di-phosphite) produced by Asahi Denka Co., to be added during polymerization, as shown in Table 1. In Comparative example 7, since the amount of phosphorus atom was too large, the polymerization of polymer was hardly proceeded and a chip necessary for a film formation could not be obtained. In Comparative example 8, since the phosphorus element content was too small, the gel fraction under the atmosphere became large. And, the stability of melt-formation of film was poor and a laminate film could not be obtained.

TABLE 1

| | Composition of polyester resin composition | | | | | | | |
|---|---|---|---|---|---|---|---|---|
| | Dicarboxylic acid component | | | Diol component | | Mole number of aromatic ring | Kind of condensation polymerization | Ti atom | P atom |
| | Kind/mol % | Kind/mol % | Trans form | Kind/mol % | Kind/mol % | (mol/kg) | catalyst | (ppm) | (ppm) |
| Example 1 | TPA/80 | CHDA/20 | 25% | EG/85 | SPG/15 | 3.48 | Ti catalyst A | 10 | 80 |
| Example 2 | TPA/75 | CHDA/25 | 25% | EG/95 | SPG/5 | 3.64 | Ti catalyst B | 10 | 80 |
| Example 3 | TPA/90 | CHDA/10 | 25% | EG/75 | SPG/25 | 3.55 | Ti catalyst C | 10 | 80 |
| Example 4 | TPA/95 | CHDA/5 | 25% | EG/97 | SPG/3 | 4.76 | Ti catalyst A | 10 | 80 |
| Example 5 | TPA/40 | CHDA/60 | 25% | EG/40 | SPG/60 | 1.17 | Ti catalyst A | 10 | 80 |
| Example 6 | TPA/80 | CHDA/20 | 25% | EG/85 | SPG/15 | 3.48 | Ti catalyst A | 10 | 80 |
| Example 7 | TPA/80 | CHDA/20 | 25% | EG/85 | SPG/15 | 3.48 | Ti catalyst A | 10 | 80 |
| Example 8 | TPA/80 | CHDA/20 | 25% | EG/85 | SPG/15 | 3.48 | Ti catalyst A | 10 | 80 |
| Example 9 | TPA/80 | CHDA/20 | 50% | EG/85 | SPG/15 | 3.48 | Ti catalyst A | 10 | 80 |
| Example 10 | TPA/80 | CHDA/20 | 25% | EG/85 | SPG/15 | 3.48 | Ti catalyst A | 5 | 80 |
| Example 11 | TPA/80 | CHDA/20 | 25% | EG/85 | SPG/15 | 3.48 | Ti catalyst A | 90 | 80 |
| Example 12 | TPA/80 | CHDA/20 | 25% | EG/85 | SPG/15 | 3.48 | Ti catalyst A | 65 | 80 |
| Example 13 | TPA/80 | CHDA/20 | 25% | EG/85 | SPG/15 | 3.48 | Ti catalyst A | 45 | 80 |
| Example 14 | TPA/80 | CHDA/20 | 25% | EG/85 | SPG/15 | 3.48 | Ti catalyst A | 10 | 50 |
| Example 15 | TPA/80 | CHDA/20 | 25% | EG/85 | SPG/15 | 3.48 | Ti catalyst A | 65 | 500 |
| Example 16 | TPA/80 | CHDA/20 | 25% | EG/85 | SPG/15 | 3.48 | Ti catalyst A | 45 | 80 |
| Comp. example 1 | TPA/85 | IPA/15 | — | EG/100 | — | 5.20 | $Sb_2O_3$ | — | 80 |
| Comp. example 2 | TPA/100 | — | — | EG/70 | CHDM/30 | 4.61 | $Sb_2O_3$ | — | 80 |
| Comp. example 3 | TPA/100 | — | — | EG/55 | SPG/45 | 3.32 | $Sb_2O_3$ | — | 80 |
| Comp. example 4 | TPA/75 | CHDA/25 | 25% | EG/100 | — | 3.87 | $Sb_2O_3$ | — | 80 |
| Comp. example 5 | TPA/80 | CHDA/20 | 25% | EG/85 | SPG/15 | 3.48 | Ti catalyst A | 510 | 80 |
| Comp. example 6 | TPA/80 | CHDA/20 | 25% | EG/85 | SPG/15 | 3.48 | Ti catalyst A | 3 | 80 |
| Comp. example 7 | TPA/80 | CHDA/20 | 25% | EG/85 | SPG/15 | 3.48 | Ti catalyst A | 10 | 520 |
| Comp. example 8 | TPA/80 | CHDA/20 | 25% | EG/85 | SPG/15 | 3.48 | Ti catalyst A | 10 | 40 |

| | Characteristics of polyester resin composition | | | | | | Condensation polymerization | Film characteristics | | |
|---|---|---|---|---|---|---|---|---|---|---|
| | Condensation polymerization temperature (° C.) | Heat of crystal fusion Tg (° C.) (J/g) | | Refractive index | Inherent viscosity | Gel fraction under the atmosphere (%) | Solubility in THF | Insufficiency of degree of vacuum present-not | Photoelastic coefficient ($\times 10^{-12} Pa^{-1}$) | Delamination properties (number) | Reflectance (%) |
| Example 1 | 270 | 78 | nd | 1.550 | 0.78 | 20 | soluble | not | 85 | 0 | 100 |
| Example 2 | 270 | 67 | nd | 1.555 | 0.73 | 10 | soluble | not | 88 | 1 | 97 |
| Example 3 | 270 | 90 | nd | 1.552 | 0.76 | 25 | soluble | not | 77 | 2 | 100 |

TABLE 1-continued

| | | | | | | | | | | | |
|---|---|---|---|---|---|---|---|---|---|---|---|
| Example 4 | 270 | 77 | nd | 1.568 | 0.68 | 5 | soluble | not | 98 | 0 | 89 |
| Example 5 | 270 | 86 | nd | 1.520 | 0.80 | 40 | soluble | not | 45 | 4 | 106 |
| Example 6 | 270 | 78 | nd | 1.550 | 0.65 | 18 | soluble | not | 85 | 0 | 93 |
| Example 7 | 270 | 78 | nd | 1.550 | 0.95 | 21 | soluble | not | 85 | 0 | 95 |
| Example 8 | 270 | 78 | nd | 1.550 | 0.78 | 18 | soluble | not | 85 | 0 | 110 |
| Example 9 | 270 | 82 | nd | 1.550 | 0.78 | 15 | soluble | not | 95 | 0 | 100 |
| Example 10 | 270 | 78 | nd | 1.550 | 0.75 | 2 | soluble | not | 85 | 0 | 100 |
| Example 11 | 270 | 78 | nd | 1.550 | 0.76 | 45 | soluble | not | 85 | 0 | 100 |
| Example 12 | 270 | 78 | nd | 1.550 | 0.75 | 40 | soluble | not | 85 | 0 | 100 |
| Example 13 | 270 | 78 | nd | 1.550 | 0.75 | 30 | soluble | not | 85 | 0 | 100 |
| Example 14 | 270 | 78 | nd | 1.550 | 0.76 | 46 | soluble | not | 85 | 0 | 93 |
| Example 15 | 270 | 78 | nd | 1.550 | 0.75 | 30 | soluble | present | 85 | 0 | 100 |
| Example 16 | 270 | 78 | nd | 1.550 | 0.76 | 25 | soluble | not | 85 | 0 | 95 |
| Comp. example 1 | 285 | 74 | nd | 1.580 | 0.65 | 5 | insoluble | not | 120 | 0 | 83 |
| Comp. example 2 | 285 | 80 | nd | 1.568 | 0.75 | 6 | insoluble | not | 105 | 2 | 87 |
| Comp. example 3 | 285 | 103 | nd | 1.552 | 0.75 | 60 | insoluble | present | 83 | 5 | 95 |
| Comp. example 4 | 285 | 62 | nd | 1.560 | 0.73 | 8 | insoluble | present | 93 | 5 | 85 |
| Comp. example 5 | 270 | 78 | nd | — | — | — | insoluble | not | — | — | — |
| Comp. example 6 | 270 | 78 | nd | — | 0.55 | 0 | soluble | present | — | — | — |
| Comp. example 7 | 270 | — | — | — | — | — | — | — | — | — | — |
| Comp. example 8 | 270 | 78 | nd | 1.550 | 0.76 | 60 | soluble | not | 85 | — | — |

Tg: glass transition temperature
nd: not detected
THF: tetrahydrofuran
TPA: terephthalic acid component
IPA: isophthalic acid component
CHDA: cyclohexane dicarboxylic acid component
EG: ethylene glycol component
SPG: spiroglycol component
CHDM: cyclohexane dimethanol component

Example 17

Synthesis of Polyester 67.6 parts by weight of dimethyl terephthalate, 17.4 parts by weight of 1,4-cyclohexane dicarboxylic acid dimethylester of which cis/trans form ratio is 70/30, 49 parts by weight of ethylene glycol, 20 parts by weight of spiroglycol and 0.06 parts by weight of manganese acetate tetrahydrate were weighed respectively, and put into an ester exchange reaction apparatus. Successively, the content was dissolved and stirred at 150° C.

While stirring, the temperature of reaction content was gradually raised up to 235° C., and distilled off methanol. After a predetermined amount of methanol was distilled off, 0.019 parts by weight of triethyl phosphonoacetate was added. 10 minutes after adding the triethyl phosphonoacetate, Titanium catalyst A was added such that an amount of titanium element is 30 ppm with respect to the polyester to be obtained. After adding the titanium catalyst A, the reaction mixture was further stirred for 10 minutes and the ester exchange reaction was finished. After that, the ester exchanged reactant was moved into a polymerization apparatus.

Successively, the content of polymerization apparatus was pressure-reduced and heated while stirring the content, and carried out a polymerization while distillating off ethylene glycol. Whereas, the pressure was reduced from normal pressure to 133 Pa or less in 90 minutes and the temperature was raised from 235° C. up to 285° C. in 90 minutes.

When the increased torque value of stirring of the polymerization apparatus reached 80% of a predetermined value, 0.15 parts by weight of bis(2,6-di-tert-butyl-4methyl phenyl)pentaerythritol-di-phosphite (product name PEP36 produced by Asahi Denka Co.) filled in a PET bottle was added while maintaining the reduced pressure condition in the polymerization apparatus. Whereas, the phosphorus compound filled in the PET bottle was set together with the PET bottle in a box separated by a valve from the polymerization apparatus and added in the polymerization apparatus, by reducing pressure in said box to the same as in the polymerization apparatus before the addition and opening the addition valve. After adding the phosphorus compound, the polymerization was successively carried out, and when a predetermined increased torque value of stirring was satisfied, the polymerization was finished.

After finishing the polymerization, inside the polymerization apparatus was returned to normal pressure by nitrogen gas, and the polymer in a gut state was discharged into a water bath by opening a valve at bottom of the polymerization apparatus. The polyester gut cooled in the water bath was cut by a cutter to make into a chip.

After finishing the first batch polymerization, the temperature of polymerization apparatus was returned to the initial condition, and, as it was, by putting the starting materials again, second batch polymerization was carried out. The obtained polymer of the 2 batches were mixed uniformly. In this way, Polyester B was obtained. Characteristics of the polymer were shown in Tables 2 and 3.

(Film Formation of Monolayer Biaxially Stretched Film)

Polyester chip B was vacuum dried, but since it was partially blocked, it was unblocked and fed to an extruder. The polyester fed to the extruder was melted at 280° C. and after filtered by a metal nonwoven filter, it was extruded as a molten sheet from a T die. The molten sheet was cooled and solidified, by a electro-pinning method (tungsten wire of 0.15 mm diameter was used as electrode), on a mirror surface drum of which surface temperature was controlled to 25° C. and turned into an unstretched sheet. A photoelastic coefficient was determined by using said unstretched sheet. The photoelastic coefficient was $85 \times 10^{-12}$ $Pa^{-1}$.

(Film Formation of Laminate Polyester Film)

The above-mentioned polyester B and a PET resin of which inherent viscosity was 0.65 were fed to 2 extruders respectively after vacuum dried respectively. Polyester B and the PET resin were respectively melted by the extruders at 280° C., and after passing through gear pumps and filters, they were joined by a feed block of 101 layers. At this time, both surfaces of the laminate film was prepared with the PET resin layer, and they were laminated alternatively such that Polyester A layer/PET resin layer was ½ as the laminate thickness. That is, they were laminated alternatively such that Polyester A layer was 50 layers and the PET layer was 51 layers.

Thus obtained laminate constituted with 101 layers was fed to a die, extruded as a sheet, and by a electro-pinning method (DC voltage 8 kV), cooled rapidly and solidified on a casting drum of its surface temperature was maintained at 25° C.

The obtained cast film was introduced to a roll type longitudinal stretching machine, heated by hot rolls of 87° C., and stretched longitudinally 3.2 times between rolls of different peripheral speed. The film of which longitudinal stretching was finished was introduced to a tenter type transverse stretching machine. The film was preheated in the tenter by a hot air of 100° C., and stretched transversely 3.5 times. The stretched film was heat treated in the tenter as it was by a hot air of 200° C. In this way, a film of 50 μm thickness could be obtained. The polyester resin composition of the present invention has a photoelastic coefficient of less than $100 \times 10^{-12}$ $Pa^{-1}$, and since its refractive index is also low, it had an excellent light reflecting properties when made into a laminate film. Characteristics of the film are shown in Table 3.

Examples 18, 19

Polyester resins were polymerized in the same way as Example 17 except changing the kind of titanium catalyst as shown in Table 2, to obtain films. The characteristics are shown in Tables 2 and 3.

Example 20

A polyester resin was polymerized in the same way as Example 17, except changing the phosphorus compound to be added after reducing the pressure to triethyl phosphonoacetate, to obtain a film. The characteristics are shown in Tables 2 and 3.

Since triethyl phosphonoacetate is a pentavalent phosphorus element, especially in the second batch polymer, thermally degraded foreign substance was a little bit easier to generate than the first batch, and a yellowish tone in its color was also clear.

Example 21

A polyester resin was polymerized in the same way as Example 17, except using PEP36 and triethyl phosphonoacetate in combination, as a phosphorus compound to be added after reducing the pressure, to obtain a film. The characteristics are shown in Tables 2 and 3. Since trivalent phosphorus and pentavalent phosphorus are 50%, respectively, thermally degraded foreign substance and color tone were improved compared to Example 20.

Example 22

A polyester resin was polymerized in the same way as Example 17, except changing the phosphorus compound to be added after reducing the pressure, to tetra(C12 to C15 alkyl)-4,4'-isopropylidene diphenyl diphosphite (product name AS1500 produced by Asahi Denka Co.), to obtain a film. The characteristics are shown in Tables 2 and 3.

Examples 23 to 28

Polyester resins were polymerized in the same way as Example 17, except changing the timing of addition of phosphorus compound to be added after reducing the pressure, the amount of addition of phosphorus compound and the amount of titanium catalyst as shown in Table 2, to obtain films. The characteristics are shown in Tables 2 and 3.

Examples 29 to 33

Polyester resins were polymerized in the same way as Example 17, except changing the amounts of addition, as starting materials, of dimethyl terephthalate, 1,4cyclohexane dicarboxylic acid dimethylester and its trans form containing ratio, ethylene glycol, spiroglycol, decalin dicarboxylic acid dimethylester and isosorbide, respectively, to the composition shown in Table 3, to obtain a film. The characteristics are shown in Tables 2 and 3.

Comparative Example 9

A polyester resin was polymerized in the same way as Example 17, except not adding the phosphorus compound after reducing the pressure, to obtain a film. In particular, in the second batch polymer, thermally degraded foreign substance exceeding 5 mm generated. In the film formation, polymer filter was clogged with foreign substances, filtration pressure increased significantly, and the film formation was stopped in a short time. The characteristics are shown in Tables 2 and 3.

Comparative Example 10

A polymerization was carried out without using titanium catalyst as a polymerization catalyst, and instead of that, antimony trioxide was added such that the amount of antimony metal is 100 ppm with respect to the polyester to be obtained. When the polymer was discharged from polymerization apparatus, gel was contained and a thick-and-thin portion was observed in the gut. And, at the film formation, laminate nonuniformity was large and reflectance was not high.

Comparative Example 11

A polymerization was carried out by changing the amount of phosphorus compound to be added after reducing the pressure, as shown in Table 2, but since the amount of addition of phosphorus compound was too large, the catalyst was deactivated and since the polymerization did not finish in 4 hours, it was stopped in the first batch.

Comparative Example 12

A polyester resin was polymerized in the same way as Example 17 except changing the amount of addition of phosphorus compound and the amount of addition of titanium catalyst as shown in Table 2 However, since the amount of titanium catalyst was too small, and since the polymerization did not finish in 4 hours, it was stopped in the first batch.

Comparative Example 13

A polyester resin was polymerized in the same way as Example 17 except changing the amount of addition of phosphorus compound and the amount of addition of titanium catalyst as shown in Table 2 However, since the amount of addition of titanium catalyst was too large, the amount of thermally degraded foreign substance or the amount of gel under the atmosphere was large, and the haze was also high and the color tone was also bad. And, an increase of inherent viscosity value which was estimated as caused by a gelation was observed.

In the film formation, too, since a gel was easy to be produced, the laminate accuracy was low and the optical characteristics of the obtained laminate film was also poor.

TABLE 2

| | Additive added before starting pressure reduction | | | | Additive added after pressure reduction | | |
|---|---|---|---|---|---|---|---|
| | Polymerization catalyst | | Phosphorus compound (1) | | Phosphorus compound (2) | | |
| | Kind | Amount of metal (ppm) | Kind | wt % | Kind | Timing of addition | wt % |
| Example 17 | Titanium A | Ti: 30 | TEPA | 0.019 | PEP36 | 80% | 0.15 |
| Example 18 | Titanium B | Ti: 30 | TEPA | 0.019 | PEP36 | 80% | 0.15 |
| Example 19 | Titanium C | Ti: 30 | TEPA | 0.019 | PEP36 | 80% | 0.15 |
| Example 20 | Titanium A | Ti: 30 | TEPA | 0.019 | TEPA | 80% | 0.14 |
| Example 21 | Titanium A | Ti: 30 | TEPA | 0.019 | TEPA PEP36 | 80% | 0.072 (TEPA) 0.075 (PEP36) |
| Example 22 | Titanium A | Ti: 30 | TEPA | 0.019 | AS1500 | 80% | 0.27 |
| Example 23 | Titanium A | Ti: 30 | TEPA | 0.019 | PEP36 | 50% | 0.15 |
| Example 24 | Titanium A | Ti: 30 | TEPA | 0.019 | PEP36 | 95% | 0.15 |
| Example 25 | Titanium A | Ti: 5 | TEPA | 0.019 | PEP36 | 80% | 0.15 |
| Example 26 | Titanium A | Ti: 100 | TEPA | 0.019 | PEP36 | 80% | 0.15 |
| Example 27 | Titanium A | Ti: 30 | TEPA | 0.019 | PEP36 | 80% | 0.05 |
| Example 28 | Titanium A | Ti: 30 | TEPA | 0.019 | PEP36 | 80% | 0.28 |
| Example 29 | Titanium A | Ti: 30 | TEPA | 0.019 | PEP36 | 80% | 0.15 |
| Example 30 | Titanium A | Ti: 30 | TEPA | 0.019 | PEP36 | 80% | 0.15 |
| Example 31 | Titanium A | Ti: 30 | TEPA | 0.019 | PEP36 | 80% | 0.15 |
| Example 32 | Titanium A | Ti: 30 | TEPA | 0.019 | PEP36 | 80% | 0.15 |
| Example 33 | Titanium A | Ti: 30 | TEPA | 0.019 | PEP36 | 80% | 0.15 |
| Comp. example 9 | Titanium A | Ti: 30 | TEPA | 0.019 | — | — | — |
| Comp. example 10 | $Sb_2O_3$ | Sb: 100 | TEPA | 0.019 | PEP36 | 80% | 0.15 |
| Comp. example 11 | Titanium A | Ti: 30 | TEPA | 0.019 | PEP36 | 80% | 0.50 |
| Comp. example 12 | Titanium A | Ti: 3 | TEPA | 0.019 | PEP36 | 80% | 0.05 |
| Comp. example 13 | Titanium A | Ti: 510 | TEPA | 0.019 | PEP36 | 80% | 0.28 |

| | Characteristics of polyester resin composition | | | | | | |
|---|---|---|---|---|---|---|---|
| | Polymerization time | Amount of phosphorus element | Thermally degraded foreign substance | Gel fraction under the atmosphere | Solubility | Haze | Color tone | |
| | (min) | (ppm) | (number) | (%) | in THF | (%) | L value | b value |
| Example 17 | 180 | 170 | A (0) | 3 | soluble | 2 | 61 | 8 |
| Example 18 | 175 | 170 | A (0) | 3 | soluble | 3 | 61 | 7 |
| Example 19 | 185 | 170 | A (0) | 3 | soluble | 5 | 61 | 8 |
| Example 20 | 240 | 170 | B (9) | 5 | soluble | 3 | 59 | 12 |
| Example 21 | 220 | 170 | B (6) | 5 | soluble | 3 | 60 | 10 |
| Example 22 | 175 | 170 | A (2) | 3 | soluble | 2 | 61 | 7 |
| Example 23 | 210 | 170 | A (0) | 3 | soluble | 2 | 61 | 13 |
| Example 24 | 155 | 170 | A (3) | 3 | soluble | 2 | 60 | 11 |
| Example 25 | 245 | 170 | A (2) | 2 | soluble | 1 | 60 | 12 |
| Example 26 | 125 | 170 | B (5) | 10 | soluble | 8 | 59 | 14 |
| Example 27 | 145 | 70 | B (7) | 6 | soluble | 3 | 59 | 12 |
| Example 28 | 210 | 300 | A (0) | 3 | soluble | 2 | 58 | 11 |
| Example 29 | 170 | 170 | A (0) | 3 | soluble | 2 | 61 | 8 |
| Example 30 | 210 | 170 | A (3) | 12 | soluble | 2 | 59 | 11 |
| Example 31 | 190 | 170 | A (0) | 3 | soluble | 2 | 61 | 8 |
| Example 32 | 195 | 170 | A (0) | 0 | soluble | 2 | 58 | 14 |
| Example 33 | 185 | 170 | A (0) | 0 | soluble | 2 | 61 | 7 |
| Comp. example 9 | 135 | 20 | C | 10 | soluble | 3 | 58 | 16 |
| Comp. example 10 | 150 | 170 | A | 55 | soluble | 10 | 55 | 14 |
| Comp. example 11 | not polymerized | 510 | — | — | soluble | — | — | — |
| Comp. example 12 | not polymerized | 70 | — | — | soluble | — | — | — |
| Comp. example 13 | 120 | 300 | C | 80 | soluble | 30 | 50 | 18 |

TEPA: triethyl phosphonoacetate
PEP36: bis(2,6-di-tert-butyl-4-methyl phenyl) pentaerythritol-di-phosphite
AS1500: tetra(C12 to C15 alkyl)-4,4'-isopropylidene diphenyl diphosphite
Polymerization time: It means time from starting pressure reduction in polymerization apparatus to end of polymerization

TABLE 3

| | Composition of polyester resin composition ||||||
|---|---|---|---|---|---|---|
| | Dicarboxylic acid component ||| Glycol component || Mole number of aromatic ring |
| | Kind/(mol %) | Kind/(mol %) | trans form (%) | Kind/(mol %) | Kind/(mol %) | (mol/kg) |
| Example 17 | TPA/80 | CHDA/20 | 30 | EG/85 | SPG/15 | 3.48 |
| Example 18 | TPA/80 | CHDA/20 | 30 | EG/85 | SPG/15 | 3.48 |
| Example 19 | TPA/80 | CHDA/20 | 30 | EG/85 | SPG/15 | 3.48 |
| Example 20 | TPA/80 | CHDA/20 | 30 | EG/85 | SPG/15 | 3.48 |
| Example 21 | TPA/80 | CHDA/20 | 30 | EG/85 | SPG/15 | 3.48 |
| Example 22 | TPA/80 | CHDA/20 | 30 | EG/85 | SPG/15 | 3.48 |
| Example 23 | TPA/80 | CHDA/20 | 30 | EG/85 | SPG/15 | 3.48 |
| Example 24 | TPA/80 | CHDA/20 | 30 | EG/85 | SPG/15 | 3.48 |
| Example 25 | TPA/80 | CHDA/20 | 30 | EG/85 | SPG/15 | 3.48 |
| Example 26 | TPA/80 | CHDA/20 | 30 | EG/85 | SPG/15 | 3.48 |
| Example 27 | TPA/80 | CHDA/20 | 30 | EG/85 | SPG/15 | 3.48 |
| Example 28 | TPA/80 | CHDA/20 | 30 | EG/85 | SPG/15 | 3.48 |
| Example 29 | TPA/95 | CHDA/5 | 30 | EG/97 | SPG/3 | 4.76 |
| Example 30 | TPA/40 | CHDA/60 | 30 | EG/40 | SPG/60 | 1.17 |
| Example 31 | TPA/80 | CHDA/20 | 50 | EG/85 | SPG/15 | 3.48 |
| Example 32 | TPA/80 | CHDA/20 | 30 | EG/85 | ISB/15 | 3.88 |
| Example 33 | TPA/90 | DDC/10 | 70 | EG/95 | SPG/5 | 4.28 |
| Comp. example 9 | TPA/80 | CHDA/20 | 30 | EG/85 | SPG/15 | 3.48 |
| Comp. example 10 | TPA/80 | CHDA/20 | 30 | EG/85 | SPG/15 | 3.48 |
| Comp. example 11 | TPA/80 | CHDA/20 | 30 | EG/85 | SPG/15 | 3.48 |
| Comp. example 12 | TPA/80 | CHDA/20 | 30 | EG/85 | SPG/15 | 3.48 |
| Comp. example 13 | TPA/80 | CHDA/20 | 30 | EG/85 | SPG/15 | 3.48 |

| | Characteristics of polyester resin composition |||| Film characteristics |||
|---|---|---|---|---|---|---|---|
| | Tg (° C.) | Heat of crystal fusion (J/g) | Refractive index | Inherent viscosity | Photoelastic coefficient ($\times 10^{-12}$ Pa$^{-1}$) | Delamination property (number) | Reflectance (%) |
| Example 17 | 77 | nd | 1.550 | 0.73 | 85 | 0 | 100 |
| Example 18 | 77 | nd | 1.550 | 0.74 | 85 | 0 | 100 |
| Example 19 | 77 | nd | 1.550 | 0.73 | 85 | 0 | 100 |
| Example 20 | 77 | nd | 1.550 | 0.72 | 85 | 0 | 96 |
| Example 21 | 77 | nd | 1.550 | 0.73 | 85 | 0 | 98 |
| Example 22 | 77 | nd | 1.550 | 0.74 | 85 | 0 | 100 |
| Example 23 | 77 | nd | 1.550 | 0.72 | 85 | 0 | 96 |
| Example 24 | 77 | nd | 1.550 | 0.73 | 85 | 0 | 98 |
| Example 25 | 77 | nd | 1.550 | 0.73 | 85 | 0 | 98 |
| Example 26 | 77 | nd | 1.550 | 0.72 | 85 | 0 | 95 |
| Example 27 | 77 | nd | 1.550 | 0.74 | 85 | 0 | 98 |
| Example 28 | 77 | nd | 1.550 | 0.73 | 85 | 0 | 100 |
| Example 29 | 77 | nd | 1.568 | 0.72 | 97 | 0 | 88 |
| Example 30 | 86 | nd | 1.520 | 0.73 | 44 | 5 | 103 |
| Example 31 | 82 | nd | 1.550 | 0.74 | 94 | 1 | 100 |
| Example 32 | 84 | nd | 1.558 | 0.73 | 90 | 0 | 98 |
| Example 33 | 77 | nd | 1.563 | 0.72 | 82 | 1 | 92 |
| Comp. example 9 | 77 | nd | 1.550 | 0.73 | 85 | 0 | 96 |
| Comp. example 10 | 77 | nd | 1.550 | 0.72 | 85 | 0 | 80 |
| Comp. example 11 | — | — | — | — | — | — | — |
| Comp. example 12 | — | — | — | — | — | — | — |
| Comp. example 13 | 77 | nd | 1.550 | 0.90 | 85 | 0 | 85 |

TPA: terephthalic acid component
CHDA: cyclohexane dicarboxylic acid component
EG: ethylene glycol component
SPG: spiroglycol component
ISB: isosorbide component
DDC: decalin dicarboxylic acid component
Tg: glass transition temperature
nd: not detected

Example 34

Synthesis of Polyester 67.6 parts by weight of dimethyl terephthalate (hereafter, DMT), 17.4 parts by weight of cyclohexane dicarboxylic acid dimethylester (hereafter, CHDC) of which cis/trans form ratio is 75/25, 50 parts by weight of ethylene glycol (hereafter, EG), and 19.9 parts by weight of spiroglycol (hereafter, SPG) were put in an ester exchange reaction apparatus, and EG solution containing 0.06 parts by weight of manganese acetate.tetrahydrate was added as ester exchange reaction catalysts and EG solution containing 0.01 parts by weight of potassium hydroxide was added and the content was dissolved at 150° C. and stirred.

Temperature of the reaction content was gradually raised up to 235° C in 4 hours while stirring and methanol was distilled off. By distilling off a predetermined amount of methanol, the ester exchange reaction was finished. After that, EG solution containing 0.01 parts by weight of trimethyl phosphate (hereafter, TMPA) and EG slurry containing 0.12 parts by weight of (2,6-di-tert-butyl-4-methyl phenyl)pentaerythritol-di-phosphite) (hereafter, PEP36) produced by Asahi Denka Co. were added. After adding TMPA, etc., and after distilling off excessive EG for 30 minutes while stirring, Titanium catalyst A was added in an amount of 30 ppm as titanium element with respect to the polyester to be obtained, and then, excessive EG was distilled off in 10 minutes while stirring, to finish the reaction.

After that, the ester exchanged reactant was moved into a condensation polymerization reaction apparatus. Successively, second batch ester exchange reaction was carried out in the same way as the first batch.

Next, a condensation polymerization reaction was carried out while distilling off EG by reducing pressure and raising temperature while stirring the content of the condensation polymerization reaction apparatus. Whereas, pressure was reduced from normal pressure to 133 Pa or less in 120 minutes, and the heating was carried out from 235° C. up to 285° C. in 90 minutes. During the condensation polymerization reaction, there occurred no defect in pressure reducing pipe and the stirring torque reached a predetermined value in a condensation polymerization reaction time of 210 minutes. Inside the condensation polymerization reaction apparatus was returned to normal pressure by nitrogen gas, and the polymer was discharged into a water bath in a gut state by opening a valve at the bottom of the condensation polymerization reaction apparatus. The polyester gut cooled in the water bath was cut by a cutter to make into a chip. After finishing the first batch condensation polymerization reaction, temperature of the condensation polymerization reaction apparatus was returned to the initial condition. After finishing the pelletizing, and after discharging the remaining polymer in the condensation polymerization reaction apparatus for approximately 30 minutes, the valve at the bottom of the condensation polymerization reaction apparatus was closed, and a small amount of nitrogen was passed around the discharge hole in order to prevent oxidation of the polymer. Successively, second batch condensation polymerization reaction was carried out. Whereas, when the pressure reducing pipe of the condensation polymerization reaction apparatus was disassembled, no deposition to the pipe of scattered substance was detected.

The composition and characteristics of thus obtained Polyester C and furthermore, the film characteristics are shown in Tables 4 and 5. Whereas, the characteristics of the obtained polyester were characteristics of the first batch.

(Film Formation of Mono Layer Biaxially Stretched Film)

Polyester C chip of the first batch was vacuum dried, but since it was partially blocked it was unblocked and fed to an extruder. Polyester C fed to the extruder was melted at 280° C. and after filtered by a metal nonwoven filter, it was extruded as a molten sheet from a T die. The molten sheet was cooled and solidified, by a electro-pinning method (tungsten wire of 0.15 mm diameter was used as electrode), on a mirror surface drum of which surface temperature was controlled to 25° C., and turned into an unstretched sheet. The refractive index and photoelastic coefficient were determined by using said unstretched sheet. The refractive index was 1.552, and the photoelastic coefficient was $85 \times 10^{-12}$ $Pa^{-1}$.

(Film Formation of Laminate Polyester Film)

After the above-mentioned Polyester C and the PET resin were vacuum dried, respectively, they were supplied to 2 extruders, respectively.

Polyester C and the PET resin were melted by the 2 extruders, respectively, at 280° C., and after passing through gear pumps and filters, they were joined by a feed block of 101 layers. At this time, both surfaces of the laminate film was prepared with the PET resin layer, and they were laminated alternatively such that Polyester C layer/PET resin layer was ½ as the laminate thickness. That is, they were laminated alternatively such that Polyester C layer was 50 layers and the PET layer was 51 layers.

Thus obtained laminate constituted with 101 layers was fed to a die, extruded as a sheet, and by a electro-pinning method (DC voltage 8 kV), cooled rapidly and solidified on a casting drum of its surface temperature was maintained at 25° C.

The obtained cast film was introduced to a roll type longitudinal stretching machine, heated by hot rolls of 90° C., and stretched longitudinally 3 times between rolls of different peripheral speed. The film of which longitudinal stretching was finished was introduced to a tenter type transverse stretching machine. The film was preheated in the tenter by a hot air of 100° C., and stretched transversely 3.3 times. The stretched film was heat treated in the tenter as it was by a hot air of 200° C. In this way, a film of 50 μm thickness could be obtained. Characteristics of the obtained film are shown in Table 5.

As stated above, in the monolayer film using Polyester C of the present invention, the photoelastic coefficient was less than $100^{-12}$ $Pa^{-1}$, and when it was made into a laminate film, there was no problem in delamination property and the light reflectance was excellent as 100%.

Examples 35 to 46

In Examples 35 to 37, ester exchange reactions and condensation polymerization reactions were carried out in the same way as Example 34 except changing the kind of metal compound which is an ester exchange reaction catalyst and the titanium catalyst which is a condensation polymerization reaction catalyst as shown in Table 4, to obtain Polyester C and a film. Their characteristics are shown in Tables 4 and 5. Whereas, as the magnesium acetate, which is the metal compound of Example 35, an EG solution containing 0.04 parts by weight, as the zinc acetate of Example 36, an EG solution containing 00.6 parts by weight, as the cobalt acetate of Example 37, an EG solution containing 0.04 parts by weight, and, as the tetra-n-butyl titanate which is a condensation polymerization reaction catalyst, an EG solution containing 0.022 parts by weight, were used.

In Examples 38, 39, 43 and 46, ester exchange reactions and condensation polymerization reactions were carried out in the same way as Example 34, except changing the amount of alkali metal, the kind of condensation polymerization reaction catalyst and the kind and amount of phosphorus compound of Example 34, as shown in Table 4, and obtained Polyester C and a film. Their characteristics are shown in Tables 4 and 5.

In addition, in Example 43, triethyl phosphonoacetate was used instead of TMPA of Example 34. In Example 46, an EG slurry containing 0.2220 parts by weight of tetra(C12 to C15alkyl)-4,4'-isopropylidene diphenyl diphosphite, produced by Asahi Denka Co., was used instead of PEP36 of Example 34.

In Examples 40 to 42, ester exchange reactions and condensation polymerization reactions were carried out in the same way as Example 34, except changing the kind of alkali metal of Example 34 as shown in Table 4, to obtain Polyester C and a film. Their characteristics are shown in Tables 4 and 5. Whereas, as alternatives of the potassium hydroxide of Example 34, the sodium hydroxide of Example 40 was added as an EG solution containing 0.002 parts by weight, the lithium acetate of Example 41 was added as an EG solution containing 0.01 parts by weight, in the same step as that of the potassium hydroxide. And, as the potassium primary phosphate of Example 42, an EG slurry containing 0.01 parts by weight was used and added in the same step as that of TMPA, etc.

In Examples 44, 45, Polyester C and a film were obtained in the same way as Example 34, except changing the condensation polymerization temperature of Example 34 as shown in Table 4. Their characteristics are shown in Tables 4 and 5.

Examples 47 to 50

Polyester C and a film were obtained in the same way as Example 34, except, as well as changing the amount ratio of DMT, CHDC, EG and SPG of Example 34, slightly changing the amount of catalyst, as shown in Tables 4 and 5. In Examples 47 and 48, a slight unevenness occurred at biaxially stretching the laminate film since their Tg were higher than PET by approximately 10° C., respectively, but they were in the range of the present invention. In Example 49, since the mole number of aromatic ring is large, photoelastic coefficient slightly increased. In Example 50, since the mole number of aromatic ring is small, refractive index decreased and an excellent light reflecting were exhibited, but since the amount of copolymerized component increased, compatibility with PET slightly decreased and interlayer delamination property turned poor. Their characteristics are shown in Tables 4 and 5.

Examples 51 and 52

In Examples 51 and 52, the inherent viscosity of Example 34 was changed as shown in Table 5. In Example 51, the inherent viscosity is 0.65 and a slight unevenness in lamination properties at film formation was observed, and the reflectance was not high for its refractive index. In Example 52, since the inherent viscosity is high as 0.90, a slight unevenness in lamination properties at film formation was observed, and the reflectance was not high for its refractive index. Their characteristics are shown in Tables 4 and 5.

Example 53

A polyester film was obtained in the same way as Example 34, except using CHDC of which cis/trans ratio was 60/40. Since trans ratio is high compared to Example 34, the value of photoelastic coefficient was higher than that of Example 34. Its characteristics are shown in Tables 4 and 5.

Example 54

A laminate polyester film was obtained in the same way as Example 34, except changing the total laminate number of 101 layers to a total laminate number of 251 layers. The thickness of the obtained laminate polyester film was 50 μm, and due to the increase of the laminate layer, light reflecting layer increased, it exhibited an excellent light reflecting properties. Its characteristics are shown in Tables 4 and 5.

Comparative Example 14

A polyester and a film were obtained in the same way as Example 34, except not containing SPG and furthermore, using 15 mol % of dimethyl isophthalate (hereafter, DMI) instead of CHDC component. Since it does not contain both of an alicyclic dicarboxylic acid component and an alicyclic diol component, the polyester had a large refractive index and photoelastic coefficient, and the reflectance of the laminate film was also small. Its characteristics are shown in Tables 4 and 5.

Comparative Example 15

A polyester and a film were obtained in the same way as Example 34, except not containing CHDC and furthermore, using 30 mol % of 1,4-cyclohexane dimethanol (CHDM) instead of the SPG component. In the polyester, the refractive index decreased slightly, but the photoelastic coefficient was slightly high, and the reflectance of laminate film was also slightly inferior. Its characteristics are shown in Tables 4 and 5.

Comparative Example 16

A polyester and a film were obtained in the same way as Example 34, except not containing CHDC and furthermore, changing the amount of SPG component to 45 mol %. In the polyester, the Tg, gel fraction and weight loss by heat were very high, and the delamination property of laminate film were also inferior. Its characteristics are shown in Tables 4 and 5.

Comparative Example 17

A polyester and a film were obtained in the same way as Example 34, except not containing SPG and furthermore, changing the amount of CHDC component to 25 mol %. Although the refractive index of the polyester was in the target range, Tg lowered and the laminate film was inferior in delamination property, and the reflectance was also low. Its characteristics are shown in Tables 4 and 5.

Comparative Examples 18 and 19

In Comparative example 18, when the titanium catalyst A which is the condensation polymerization reaction catalyst of Example 34 was added in a smaller amount than the range of the present invention as shown in Table 4, an insufficiency of degree of vacuum occurred and since predetermined condensation polymerization reaction could not be made, the reaction was stopped.

In Comparative example 19, an ester exchange reaction and a condensation polymerization reaction was carried out in the same way as Example 34, except adding antimony trioxide which is a condensation polymerization reaction catalyst. However, in the second half of discharge, it was in a condition that a thick-and-thin gut was discharged from the discharging hole, and, a big black colored foreign substance was observed in the polymer of successive batch, furthermore, it was a polymer of which gel fraction or weight loss by heat was high. And, in the obtained laminate film, an unevenness of laminate thickness was recognized and it was also inferior in delamination property or reflectance. Its characteristics are shown Tables 4 and 5.

Comparative Examples 20 and 21

In Comparative example 20, an ester exchange reaction and a condensation polymerization reaction was carried out in the same way as Example 34, except without using TMPA of Example 34, furthermore, the amount of addition of PEP was made smaller than the range of the present invention as the amount of addition of phosphorus element. However, a big black colored foreign substance was observed in the polymer of successive batch, furthermore, it was a polymer of which gel fraction or weight loss by heat were high. In the obtained laminate film, an unevenness of laminate thickness was recognized and it was also inferior in delamination property or reflectance. Its characteristics are shown Tables 4 and 5.

In Comparative example 21, when an ester exchange reaction and a condensation polymerization reaction were carried out in the same way as Example 46, except increasing the amount of addition of AS1500 of Example 46, to make the amount of addition of total phosphorus element larger than the range of the present invention, since predetermined condensation polymerization reaction could not be made, the reaction was stopped. Its characteristics are shown in Tables 4 and 5.

TABLES 4

| | Composition of polyester resin composition | | | | | |
|---|---|---|---|---|---|---|
| | Dicarboxylic acid component | | | Diol component | | Mole number of aromatic ring |
| | Kind/(mol %) | Kind/(mol %) | Trans form (%) | Kind/(mol %) | Kind/(mol %) | (mol/kg) |
| Example 34 | TPA/80 | CHDA/20 | 25 | EG/85 | SPG/15 | 3.48 |
| Example 35 | TPA/80 | CHDA/20 | 25 | EG/85 | SPG/15 | 3.48 |
| Example 36 | TPA/80 | CHDA/20 | 25 | EG/85 | SPG/15 | 3.48 |
| Example 37 | TPA/80 | CHDA/20 | 25 | EG/85 | SPG/15 | 3.48 |
| Example 38 | TPA/80 | CHDA/20 | 25 | EG/85 | SPG/15 | 3.48 |
| Example 39 | TPA/80 | CHDA/20 | 25 | EG/85 | SPG/15 | 3.48 |
| Example 40 | TPA/80 | CHDA/20 | 25 | EG/85 | SPG/15 | 3.48 |
| Example 41 | TPA/80 | CHDA/20 | 25 | EG/85 | SPG/15 | 3.48 |
| Example 42 | TPA/80 | CHDA/20 | 25 | EG/85 | SPG/15 | 3.48 |
| Example 43 | TPA/80 | CHDA/20 | 25 | EG/85 | SPG/15 | 3.48 |
| Example 44 | TPA/80 | CHDA/20 | 25 | EG/85 | SPG/15 | 3.48 |
| Example 45 | TPA/80 | CHDA/20 | 25 | EG/85 | SPG/15 | 3.48 |
| Example 46 | TPA/80 | CHDA/20 | 25 | EG/85 | SPG/15 | 3.48 |
| Example 47 | TPA/75 | CHDA/25 | 25 | EG/95 | SPG/5 | 3.64 |
| Example 48 | TPA/90 | CHDA/10 | 25 | EG/75 | SPG/25 | 3.55 |
| Example 49 | TPA/95 | CHDA/5 | 25 | EG/97 | SPG/3 | 4.76 |
| Example 50 | TPA/40 | CHDA/60 | 25 | EG/40 | SPG/60 | 1.17 |
| Example 51 | TPA/80 | CHDA/20 | 25 | EG/85 | SPG/15 | 3.48 |
| Example 52 | TPA/80 | CHDA/20 | 25 | EG/85 | SPG/15 | 3.48 |
| Example 53 | TPA/80 | CHDA/20 | 40 | EG/85 | SPG/15 | 3.48 |
| Example 54 | TPA/80 | CHDA/20 | 25 | EG/85 | SPG/15 | 3.48 |
| Comp. example 14 | TPA/85 | IPA/15 | — | EG/100 | — | 5.20 |
| Comp. example 15 | TPA/100 | — | — | EG/70 | CHDM/30 | 4.61 |
| Comp. example 16 | TPA/100 | — | — | EG/55 | SPG/45 | 3.32 |
| Comp. example 17 | TPA/75 | CHDA/25 | 25 | EG/100 | — | 3.87 |
| Comp. example 18 | TPA/80 | CHDA/20 | 25 | EG/85 | SPG/15 | 3.48 |
| Comp. example 19 | TPA/80 | CHDA/20 | 25 | EG/85 | SPG/15 | 3.48 |
| Comp. example 20 | TPA/80 | CHDA/20 | 25 | EG/85 | SPG/15 | 3.48 |
| Comp. example 21 | TPA/80 | CHDA/20 | 25 | EG/85 | SPG/15 | 3.48 |

| | Ester exchange reaction (EI) EI catalyst | | | Additive Alkali metal | | | Condensation polymerization reaction catalyst | | |
|---|---|---|---|---|---|---|---|---|---|
| | Metal compound | Amount of addition of compound (ppm) | Amount of metal element (ppm) | Kind of compound | Amount of addition of compound (ppm) | Amount of metal element (ppm) | Kind of catalyst | Amount of addition of catalyst (ppm) | Amount of metal element (ppm) |
| Example 34 | Mn acetate | 600 | 131 | K hydroxide | 100 | 59 | Ti catalyst A | 780 | 30 |
| Example 35 | Mg acetate | 400 | 45 | K hydroxide | 100 | 59 | Ti catalyst B | 460 | 30 |
| Example 36 | Zn acetate | 600 | 177 | K hydroxide | 100 | 59 | Ti catalyst C | 580 | 30 |
| Example 37 | Co acetate | 400 | 94 | K hydroxide | 100 | 59 | TBT | 220 | 30 |
| Example 38 | Mn acetate | 600 | 131 | K hydroxide | 10 | 6 | Ti catalyst A | 260 | 10 |
| Example 39 | Mn acetate | 600 | 131 | K hydroxide | 50 | 30 | Ti catalyst A | 780 | 30 |
| Example 40 | Mn acetate | 600 | 131 | Na hydroxide | 20 | 6 | Ti catalyst A | 780 | 30 |
| Example 41 | Mn acetate | 600 | 131 | Li acetate | 100 | 7 | Ti catalyst A | 780 | 30 |
| Example 42 | Mn acetate | 600 | 131 | K primary phosphate | 100 | 29 | Ti catalyst A | 780 | 30 |
| Example 43 | Mn acetate | 600 | 131 | K hydroxide | 100 | 59 | Ti catalyst A | 780 | 30 |
| Example 44 | Mn acetate | 600 | 131 | K hydroxide | 100 | 59 | Ti catalyst A | 780 | 30 |
| Example 45 | Mn acetate | 600 | 131 | K hydroxide | 100 | 59 | Ti catalyst A | 780 | 30 |
| Example 46 | Mn acetate | 600 | 131 | K hydroxide | 100 | 59 | Ti catalyst A | 780 | 30 |
| Example 47 | Mn acetate | 600 | 131 | K hydroxide | 50 | 30 | Ti catalyst A | 520 | 20 |
| Example 48 | Mn acetate | 600 | 131 | K hydroxide | 100 | 59 | Ti catalyst A | 780 | 30 |
| Example 49 | Mn acetate | 600 | 131 | K hydroxide | 30 | 18 | Ti catalyst A | 260 | 10 |
| Example 50 | Mn acetate | 600 | 131 | K hydroxide | 100 | 59 | Ti catalyst A | 780 | 30 |
| Example 51 | Mn acetate | 600 | 131 | K hydroxide | 100 | 59 | Ti catalyst A | 780 | 30 |
| Example 52 | Mn acetate | 600 | 131 | K hydroxide | 100 | 59 | Ti catalyst A | 780 | 30 |
| Example 53 | Mn acetate | 600 | 131 | K hydroxide | 100 | 59 | Ti catalyst A | 780 | 30 |
| Example 54 | Mn acetate | 600 | 131 | K hydroxide | 100 | 59 | Ti catalyst A | 780 | 30 |
| Comp. example 14 | Mn acetate | 600 | 131 | K hydroxide | 100 | 59 | Ti catalyst A | 780 | 30 |
| Comp. example 15 | Mn acetate | 600 | 131 | K hydroxide | 100 | 59 | Ti catalyst A | 780 | 30 |
| Comp. example 16 | Mn acetate | 600 | 131 | K hydroxide | 100 | 59 | Ti catalyst A | 780 | 30 |

TABLES 4-continued

| | | | | | | | | | |
|---|---|---|---|---|---|---|---|---|---|
| Comp. example 17 | Mn acetate | 600 | 131 | K hydroxide | 100 | 59 | Ti catalyst A | 780 | 30 |
| Comp. example 18 | Mn acetate | 600 | 131 | K hydroxide | 100 | 59 | Ti catalyst A | 80 | 3 |
| Comp. example 19 | Mn acetate | 600 | 131 | K hydroxide | 100 | 59 | Sb trioxide | 650 | 543 |
| Comp. example 20 | Mn acetate | 600 | 131 | K hydroxide | 100 | 59 | Ti catalyst A | 780 | 30 |
| Comp. example 21 | Mn acetate | 600 | 131 | K hydroxide | 100 | 59 | Ti catalyst A | 780 | 30 |

| | Amount of addition of phosphorus compound | | | | | | | Condensation polymerization reactivity | | |
|---|---|---|---|---|---|---|---|---|---|---|
| | Phosphorus compound (1) | | | Trivalent phosphorus compound (2) | | | Amount of total phosphorus element (ppm) | Condensation polymerization temperature (° C.) | Insufficiency of degree of vacuum present.not | Polymerization time (min) |
| | Kind | Amount of addition of compound (ppm) | Amount of phosphorus element (ppm) | Kind | Amount of addition of compound (ppm) | Amount of phosphorus element (ppm) | | | | |
| Example 34 | TMPA | 100 | 22 | PEP36 | 1200 | 118 | 140 | 285 | not | 210 |
| Example 35 | TMPA | 100 | 22 | PEP36 | 1200 | 118 | 140 | 285 | not | 204 |
| Example 36 | TMPA | 100 | 22 | PEP36 | 1200 | 118 | 140 | 285 | not | 193 |
| Example 37 | TMPA | 100 | 22 | PEP36 | 1200 | 118 | 140 | 285 | not | 218 |
| Example 38 | TMPA | 50 | 11 | PEP36 | 500 | 49 | 60 | 285 | not | 183 |
| Example 39 | TMPA | 100 | 22 | PEP36 | 1200 | 118 | 140 | 285 | not | 184 |
| Example 40 | TMPA | 100 | 22 | PEP36 | 1200 | 118 | 140 | 285 | not | 181 |
| Example 41 | TMPA | 100 | 22 | PEP36 | 1200 | 118 | 140 | 285 | not | 182 |
| Example 42 | TMPA | 100 | 22 | PEP36 | 1200 | 118 | 140 | 285 | not | 206 |
| Example 43 | TEPA | 160 | 22 | PEP36 | 1200 | 118 | 140 | 285 | not | 202 |
| Example 44 | TMPA | 100 | 22 | PEP36 | 1200 | 118 | 140 | 270 | not | 235 |
| Example 45 | TMPA | 100 | 22 | PEP36 | 1200 | 118 | 140 | 290 | not | 170 |
| Example 46 | TMPA | 100 | 22 | AS1500 | 2220 | 118 | 140 | 285 | not | 204 |
| Example 47 | TMPA | 100 | 22 | PEP36 | 700 | 69 | 91 | 285 | not | 198 |
| Example 48 | TMPA | 100 | 22 | PEP36 | 1200 | 118 | 140 | 285 | not | 184 |
| Example 49 | TMPA | 50 | 11 | PEP36 | 500 | 49 | 60 | 285 | not | 185 |
| Example 50 | TMPA | 100 | 22 | PEP36 | 2000 | 196 | 218 | 285 | not | 172 |
| Example 51 | TMPA | 100 | 22 | PEP36 | 1200 | 118 | 140 | 285 | not | 175 |
| Example 52 | TMPA | 100 | 22 | PEP36 | 1200 | 118 | 140 | 285 | not | 233 |
| Example 53 | TMPA | 100 | 22 | PEP36 | 1200 | 118 | 140 | 285 | not | 180 |
| Example 54 | TMPA | 100 | 22 | PEP36 | 1200 | 118 | 140 | 285 | not | 210 |
| Comp. example 14 | TMPA | 100 | 22 | PEP36 | 1200 | 118 | 140 | 285 | not | 225 |
| Comp. example 15 | TMPA | 100 | 22 | PEP36 | 1200 | 118 | 140 | 285 | not | 230 |
| Comp. example 16 | TMPA | 100 | 22 | PEP36 | 1200 | 118 | 140 | 285 | not | 188 |
| Comp. example 17 | TMPA | 100 | 22 | PEP36 | 1200 | 118 | 140 | 285 | not | 205 |
| Comp. example 18 | TMPA | 50 | 11 | PEP36 | 500 | 49 | 60 | 285 | present | reaction stopped |
| Comp. example 19 | TMPA | 500 | 110 | PEP36 | 3000 | 294 | 404 | 285 | not | 123 |
| Comp. example 20 | TMPA | — | — | PEP36 | 400 | 39 | 39 | 285 | not | 152 |
| Comp. example 21 | TMPA | 100 | 22 | AS1500 | 10200 | 541 | 563 | 285 | not | reaction stopped |

TPA: terephthalic acid component
CHDA: cyclohexane dicarboxylic acid component
EG: ethylene glycol component
SPG: spiroglycol component
IPA: isophthalic acid component
CHDM: 1,4-cyclohexane dimethanol component
Mn acetate: manganese acetate•tetrahydrate
Mg acetate: magnesium acetate•tetrahydrate
Zn acetate: zinc acetate•dihydrate
Co acetate: cobalt acetate•tetrahydrate
K hydroxide: potassium hydroxide
Na hydroxide: sodium hydroxide
Li acetate: lithium acetate•dihydrate
K primary phosphate: potassium primary phosphate
TBT: tetra-n-butyl titanate
Sb trioxide: Antimony trioxide
Ge dioxide: germanium dioxide
TMPA: trimethyl phosphate
TEPA: triethyl phosphonoacetate
PEP36: bis(2,6-di-tert-butyl-4-methyl phenyl) pentaerythritol-di-phosphite
AS1500: tetra(C12 to C15 alkyl)-4,4'-isopropylidene diphenyl diphosphite

TABLES 5

| | Composition of polyester resin composition ||||| |
|---|---|---|---|---|---|---|
| | Dicarboxylic acid component ||| Diol component || Mole number of aromatic ring |
| | Kind/(mol %) | Kind/(mol %) | Trans form (%) | Kind/(mol %) | Kind/(mol %) | (mol/kg) |
| Example 34 | TPA/80 | CHDA/20 | 25 | EG/85 | SPG/15 | 3.48 |
| Example 35 | TPA/80 | CHDA/20 | 25 | EG/85 | SPG/15 | 3.48 |
| Example 36 | TPA/80 | CHDA/20 | 25 | EG/85 | SPG/15 | 3.48 |
| Example 37 | TPA/80 | CHDA/20 | 25 | EG/85 | SPG/15 | 3.48 |
| Example 38 | TPA/80 | CHDA/20 | 25 | EG/85 | SPG/15 | 3.48 |
| Example 39 | TPA/80 | CHDA/20 | 25 | EG/85 | SPG/15 | 3.48 |
| Example 40 | TPA/80 | CHDA/20 | 25 | EG/85 | SPG/15 | 3.48 |
| Example 41 | TPA/80 | CHDA/20 | 25 | EG/85 | SPG/15 | 3.48 |
| Example 42 | TPA/80 | CHDA/20 | 25 | EG/85 | SPG/15 | 3.48 |
| Example 43 | TPA/80 | CHDA/20 | 25 | EG/85 | SPG/15 | 3.48 |
| Example 44 | TPA/80 | CHDA/20 | 25 | EG/85 | SPG/15 | 3.48 |
| Example 45 | TPA/80 | CHDA/20 | 25 | EG/85 | SPG/15 | 3.48 |
| Example 46 | TPA/80 | CHDA/20 | 25 | EG/85 | SPG/15 | 3.48 |
| Example 47 | TPA/75 | CHDA/25 | 25 | EG/95 | SPG/5 | 3.64 |
| Example 48 | TPA/90 | CHDA/10 | 25 | EG/75 | SPG/25 | 3.55 |
| Example 49 | TPA/95 | CHDA/5 | 25 | EG/97 | SPG/3 | 4.76 |
| Example 50 | TPA/40 | CHDA/60 | 25 | EG/40 | SPG/60 | 1.17 |
| Example 51 | TPA/80 | CHDA/20 | 25 | EG/85 | SPG/15 | 3.48 |
| Example 52 | TPA/80 | CHDA/20 | 25 | EG/85 | SPG/15 | 3.48 |
| Example 53 | TPA/80 | CHDA/20 | 40 | EG/85 | SPG/15 | 3.48 |
| Example 54 | TPA/80 | CHDA/20 | 25 | EG/85 | SPG/15 | 3.48 |
| Comp. example 14 | TPA/85 | IPA/15 | — | EG/100 | — | 5.20 |
| Comp. example 15 | TPA/100 | — | — | EG/70 | CHDM/30 | 4.61 |
| Comp. example 16 | TPA/100 | — | — | EG/55 | SPG/45 | 3.32 |
| Comp. example 17 | TPA/75 | CHDA/25 | 25 | EG/100 | — | 3.87 |
| Comp. example 18 | TPA/80 | CHDA/20 | 25 | EG/85 | SPG/15 | 3.48 |
| Comp. example 19 | TPA/80 | CHDA/20 | 25 | EG/85 | SPG/15 | 3.48 |
| Comp. example 20 | TPA/80 | CHDA/20 | 25 | EG/85 | SPG/15 | 3.48 |
| Comp. example 21 | TPA/80 | CHDA/20 | 25 | EG/85 | SPG/15 | 3.48 |

| | Characteristics of polyester resin composition ||||||||||||
|---|---|---|---|---|---|---|---|---|---|---|---|---|
| | | Amount of metal element (ppm) |||||||||||
| | Inherent viscosity | Mn | Mg | Zn | Co | K | Na | Li | Ti | Sb | Ge | P |
| Example 34 | 0.71 | 120 | — | — | — | 57 | 41 | — | 28 | — | — | 119 |
| Example 35 | 0.70 | — | 40 | — | — | 58 | — | — | 29 | — | — | 120 |
| Example 36 | 0.71 | — | — | 160 | — | 59 | 14 | — | 28 | — | — | 120 |
| Example 37 | 0.71 | — | — | — | 85 | 57 | — | — | 30 | — | — | 122 |
| Example 38 | 0.71 | 115 | — | — | — | 6 | 13 | — | 9 | — | — | 53 |
| Example 39 | 0.71 | 120 | — | — | — | 29 | 40 | — | 30 | — | — | 120 |
| Example 40 | 0.72 | 125 | — | — | — | — | 46 | — | 29 | — | — | 122 |
| Example 41 | 0.71 | 120 | — | — | — | — | 40 | 7 | 29 | — | — | 118 |
| Example 42 | 0.72 | 120 | — | — | — | 27 | 41 | — | 28 | — | — | 141 |
| Example 43 | 0.71 | 125 | — | — | — | 57 | 39 | — | 29 | — | — | 125 |
| Example 44 | 0.70 | 120 | — | — | — | 58 | 39 | — | 29 | — | — | 119 |
| Example 45 | 0.71 | 115 | — | — | — | 58 | 40 | — | 29 | — | — | 118 |
| Example 46 | 0.72 | 120 | — | — | — | 57 | 40 | — | 30 | — | — | 121 |
| Example 47 | 0.70 | 120 | — | — | — | 29 | 27 | — | 19 | — | — | 78 |
| Example 48 | 0.70 | 120 | — | — | — | 56 | 40 | — | 28 | — | — | 118 |
| Example 49 | 0.70 | 125 | — | — | — | 18 | 13 | — | 9 | — | — | 55 |
| Example 50 | 0.72 | 120 | — | — | — | 57 | 40 | — | 30 | — | — | 188 |
| Example 51 | 0.65 | 120 | — | — | — | 57 | 39 | — | 29 | — | — | 120 |
| Example 52 | 0.90 | 120 | — | — | — | 58 | 38 | — | 29 | — | — | 118 |
| Example 53 | 0.71 | 120 | — | — | — | 58 | 40 | — | 29 | — | — | 120 |
| Example 54 | 0.72 | 120 | — | — | — | 57 | 41 | — | 28 | — | — | 119 |
| Comp. example 14 | 0.72 | 120 | — | — | — | 57 | 40 | — | 28 | — | — | 122 |
| Comp. example 15 | 0.70 | 125 | — | — | — | 57 | 39 | — | 28 | — | — | 120 |
| Comp. example 16 | 0.70 | 115 | — | — | — | 58 | 39 | — | 28 | — | — | 121 |
| Comp. example 17 | 0.71 | 120 | — | — | — | 57 | 38 | — | 30 | — | — | 119 |
| Comp. example 18 | — | polymer not obtained and unmeasurable | | | | — | — | — | — | — | — | — |
| Comp. example 19 | 0.71 | 120 | — | — | — | 56 | — | — | — | 520 | — | 351 |
| Comp. example 20 | 0.70 | 125 | — | — | — | 58 | 39 | — | 29 | — | — | 35 |
| Comp. example 21 | — | polymer not obtained and unmeasurable | | | | — | — | — | — | — | — | — |

TABLES 5-continued

| | Characteristics of polyester resin composition | | | | | | | | | | |
|---|---|---|---|---|---|---|---|---|---|---|---|
| | | | Thermally degraded | | | | | | | Film characteristics | |
| | | Heat of crystal fusion (J/g) | black colored substance (number) | Gel fraction (%) | | Weight loss by heat (%) | | Refractive index | Photo- elastic coefficient (×10⁻¹² Pa⁻¹) | Delam- ination property (number) | Reflectance (%) |
| | Tg (° C.) | | | Under the atmosphere | Under nitrogen | Under the atmosphere | Under nitrogen | | | | |
| Example 34 | 78 | nd | A (0) | 26 | 2 | 0.8 | 0.2 | 1.552 | 85 | 0 | 100 |
| Example 35 | 77 | nd | A (0) | 29 | 3 | 0.9 | 0.3 | 1.553 | 86 | 0 | 97 |
| Example 36 | 80 | nd | A (0) | 31 | 2 | 0.9 | 0.2 | 1.548 | 84 | 1 | 99 |
| Example 37 | 79 | nd | A (0) | 30 | 3 | 1.0 | 0.3 | 1.550 | 85 | 0 | 100 |
| Example 38 | 77 | nd | A (1) | 34 | 2 | 0.8 | 0.3 | 1.552 | 86 | 0 | 100 |
| Example 39 | 80 | nd | B (6) | 31 | 3 | 0.6 | 0.2 | 1.554 | 85 | 2 | 97 |
| Example 40 | 79 | nd | A (1) | 33 | 2 | 0.9 | 0.4 | 1.552 | 87 | 1 | 100 |
| Example 41 | 77 | nd | A (0) | 33 | 4 | 1.3 | 0.3 | 1.550 | 83 | 0 | 97 |
| Example 42 | 79 | nd | B (7) | 37 | 5 | 1.0 | 0.6 | 1.553 | 85 | 1 | 99 |
| Example 43 | 78 | nd | B (5) | 27 | 2 | 1.1 | 0.6 | 1.557 | 88 | 2 | 97 |
| Example 44 | 78 | nd | B (4) | 28 | 2 | 0.8 | 0.5 | 1.553 | 86 | 0 | 99 |
| Example 45 | 79 | nd | B (6) | 30 | 5 | 1.1 | 0.6 | 1.556 | 85 | 0 | 100 |
| Example 46 | 80 | nd | A (2) | 29 | 3 | 0.8 | 0.3 | 1.551 | 89 | 1 | 97 |
| Example 47 | 67 | nd | A (0) | 30 | 3 | 0.7 | 0.4 | 1.555 | 88 | 2 | 97 |
| Example 48 | 90 | nd | A (2) | 31 | 4 | 0.9 | 0.4 | 1.552 | 77 | 3 | 100 |
| Example 49 | 77 | nd | A (0) | 27 | 3 | 0.6 | 0.2 | 1.568 | 98 | 0 | 89 |
| Example 50 | 86 | nd | B (6) | 39 | 9 | 1.4 | 0.6 | 1.520 | 45 | 4 | 106 |
| Example 51 | 78 | nd | A (0) | 30 | 3 | 0.9 | 0.2 | 1.552 | 85 | 0 | 93 |
| Example 52 | 78 | nd | A (2) | 32 | 6 | 0.8 | 0.2 | 1.552 | 85 | 0 | 95 |
| Example 53 | 82 | nd | A (0) | 29 | 3 | 0.7 | 0.4 | 1.550 | 92 | 0 | 100 |
| Example 54 | 78 | nd | A (0) | 26 | 2 | 0.8 | 0.2 | 1.552 | 85 | 0 | 110 |
| Comp. example 14 | 78 | nd | A (0) | 1 | 0 | 0.8 | 0.2 | 1.580 | 120 | 0 | 83 |
| Comp. example 15 | 80 | nd | A (3) | 33 | 1 | 0.7 | 0.4 | 1.568 | 105 | 2 | 85 |
| Comp. example 16 | 103 | nd | C | 63 | 24 | 2.6 | 1.1 | 1.552 | 83 | 6 | 95 |
| Comp. example 17 | 62 | nd | C | 52 | 11 | 0.8 | 0.5 | 1.560 | 93 | 7 | 85 |
| Comp. example 18 | — | — | — | — | — | — | — | — | — | — | — |
| Comp. example 19 | 79 | nd | C | 63 | 21 | 2.2 | 1.4 | 1.550 | 85 | 6 | 86 |
| Comp. example 20 | 80 | nd | C | 58 | 17 | 2.5 | 1.9 | 1.556 | 86 | 5 | 88 |
| Comp. example 21 | — | — | — | — | — | — | — | — | — | — | — |

Tg: glass transition temperature
nd: not detected

Example 55

Synthesis of Polyester 67.6 parts by weight of dimethyl terephthalate, 17.4 parts by weight of 1,4-cyclohexane dicarboxylic acid dimethylester of which cis/trans form ratio is 75/25 (hereafter, CHDC), 54 parts by weight of ethylene glycol, 20 parts by weight of spiroglycol (hereafter, SPG) and 0.04 parts by weight of manganese acetate tetrahydrate were respectively weighed and put into an ester exchange reaction apparatus. The content was dissolved at 150° C. and stirred.

While stirring, temperature of the reaction content was gradually raised up to 235° C., and methanol was distilled off. After a predetermined amount of methanol was distilled off, ethylene glycol solution containing 0.02 parts by weight (28 ppm as phosphorus element) of triethyl phosphonoacetate (hereafter, TEPA) and 0.15 parts by weight (147 ppm as phosphorus element) of bis(2,6-di-tert-butyl-4-methyl phenyl)pentaerythritol-diphosphite produced by Asahi Denka Co. (hereafter, PEP36) was added and an ester exchange reaction was finished. After adding the triethyl phosphonoacetate, it was stirred for 10 minutes, and Titanium catalyst A was added such that an amount of the titanium atom was 20 ppm with respect to the polyester to be obtained. After that, the ester exchanged reactant was moved to a polymerization apparatus.

Next, a condensation polymerization reaction was carried out while distilling off EG by reducing pressure and raising temperature while stirring the content of the condensation polymerization reaction apparatus. Whereas, pressure was reduced from normal pressure to 133 Pa or less in 90 minutes, and the heating was carried out from 235° C. up to 285° C. in 90 minutes. When the stirring torque of the polymerization reaction apparatus reached a predetermined value, inside the polymerization reaction apparatus was returned to normal pressure by nitrogen gas, and the polymer was discharged into a water bath in a gut state by opening a valve at the bottom of the polymerization reaction apparatus. The polyester gut cooled in the water bath was cut by a cutter to make into a chip. The inherent viscosity of the obtained polyester was 0.72.

After blending PEP36 in an amount of 0.15 wt % in weight ratio to the above-mentioned chip, it was melt-extruded at 250° C. by a vent type twin screw extruder of 65 mm of which L/D is 31.5, to obtain Polyester resin composition D excellent in thermal resistance having an inherent viscosity of 0.65, a gel fraction of 1.0%, a color tone b value of 10 and a haze of 1.0.

Similarly, a PET resin was polymerized in the same way as the above-mentioned, except using 100 parts by weight of dimethyl terephthalate and 64 parts by weight of ethylene glycol. The inherent viscosity of the obtained PET resin was 0.65, and the Tg was 80° C.

(Film Formation of Monolayer Biaxially Stretched Film)

The chip of Polyester resin composition D was fed to a vent type twin screw extruder and melted and filtered by a metal nonwoven filter and then extruded as a molten sheet from a T die. The molten sheet was, by a electro-pinning method (tungsten wire of 0.15 mm diameter was used as electrode), cooled and solidified on a mirror surface drum of which surface temperature was controlled to 25° C., to become an unstretched sheet. A photoelastic coefficient was determined by using said unstretched sheet. The photoelastic coefficient was $85 \times 10^{-12}$ $Pa^{-1}$.

(Film Formation of Laminate Polyester Film)

The above-mentioned Polyester D and the PET resin were respectively supplied to 2 vent type twin screw extruders. Polyester D and the PET resin were respectively melted by extruders, and after passing through gear pumps and filters, joined in a feed block of 101 layers. At this time, both surfaces of the laminate film was prepared with the PET resin layer, and they were laminated alternatively such that Polyester D layer/PET resin layer was ½ as the laminate thickness. That is, they were laminated alternatively such that Polyester D layer was 50 layers and the PET layer was 51 layers.

Thus obtained laminate constituted with 101 layers was fed to a die, extruded as a sheet, and by a electro-pinning method (DC voltage 8 kV), cooled rapidly and solidified on a casting drum of which surface temperature was maintained at 25° C.

The obtained cast film was introduced to a roll type longitudinal stretching machine, heated by hot rolls of 90° C., and stretched longitudinally 3 times between rolls of different peripheral speed. The film of which longitudinal stretching was finished was introduced to a tenter type transverse stretching machine. The film was preheated in the tenter by a hot air of 100° C., and stretched transversely 3.3 times. The stretched film was heat treated in the tenter as it was by a hot air of 200° C. In this way, a film of 50 μm thickness could be obtained.

The characteristics of the obtained Polyester resin composition D and the film are shown in Tables 6 and 7. The polyester resin composition of the present invention had a photoelastic coefficient of $85 > 10^{-12}$ $Pa^{-1}$, and since its refractive index was also low as 1.550, it had an excellent light reflecting properties as a laminate film.

Example 56

A polyester was polymerized in the same way as Example 55, except changing the kind of titanium catalyst as shown in Tables 6. Furthermore, by using the PET resin polymerized in Example 55, a laminate film was obtained in the same condition. Results are shown in Tables 6 and 7. It showed a satisfactory characteristics like Example 55.

Example 57

A polyester was polymerized in the same way as Example 55, except changing the kind of titanium catalyst from the chelate to an alkoxide. Furthermore, using the PET resin polymerized in Example 55, a laminate film was obtained in the same condition. Results are shown in Tables 6 and 7. Compared to Example 55, although it was slightly inferior in gel fraction, color tone b value and haze, it exhibited a satisfactory characteristics in its quality.

Examples 58 and 59

As shown in Tables 6, a polyester was polymerized in the same way as Example 55, except changing the amounts of CHDC and SPG. Furthermore, using the PET resin polymerized in Example 55, a laminate film was obtained in the same condition.

Results are shown in Tables 6 and 7. Although Example 58 showed a satisfactory characteristics, since the mole number of aromatic ring was large, the photoelastic coefficient slightly increased. And, in Example 59, since the refractive index was sufficiently low, it showed an excellent light reflecting properties, but, since the amount of copolymerized component increased, compatibility with PET lowered and interlayer delamination property was weak, and since the copolymerized amount of SPG was large, gel fraction slightly increased.

Examples 60 and 61

As shown in Table 6, Example 55 was repeated in the same way except changing the amount of Ti catalyst. Results are shown in Tables 6 and 7, but in Example 60, since the amount of Ti catalyst is large, the gel fraction was slightly high, and b value increased. On the other hand, in Example 61, since the amount of Ti catalyst was small, on the contrary, good results in both of gel fraction and b value were obtained.

Examples 62 and 63

A polyester film was obtained in the same way as Example 55, except changing the amount of PEP36 to be kneaded to 0.05 wt % and 0.50 wt %, respectively. Results are shown in Tables 6 and 7. In Example 62, since the amount of phosphorus in the polyester after the kneading was small as 75 ppm, gel fraction resulted in a slight increase.

In addition, in Example 63, since the amount of phosphorus in the polyester after the kneading was 420 ppm, gel fraction decreased, but haze increased slightly.

Example 64

A polyester film was obtained in the same way as Example 55, except using CHDC of which ratio of cis/trans form was trans form 40%. Results are shown in Tables 6 and 7. At the time of polymerization, due to precipitation of trans form, feeding pipe, etc. were slightly apt to be clogged and the obtained film was, since the amount of the trans form was large, a little bit high in photoelastic coefficient.

Examples 65

A polyester film was obtained in the same way as Example 55, except changing to 25 mol % of decalin dicarboxylic acid dimethylester instead of CHDC. Results are shown in Tables 6 and 7. Although quality was satisfied, the delamination property were slightly inferior.

Examples 66

A polyester film was obtained in the same way as Example 55, except changing to 10 mol % of isosorbide instead of SPG. Results are shown in Tables 6 and 7. Although quality was satisfied, the color tone b value was high.

Comparative Example 22

A polyester was polymerized in the same way as Example 55, except adding 15 mol % of isophthalic acid instead of CHDC, without adding spiroglycol, and using 0.02 wt % of ordinary antimony trioxide as a condensation polymerization catalyst, to obtain a laminate film. Results are shown in Tables 6 and 7. Since any one of alicyclic dicarboxylic acid component and alicyclic diol component was not contained, the refractive index and photoelastic coefficient of the polyester were large, and the reflectance of the laminate film was also small.

Comparative Example 23

A polyester was polymerized in the same way as Example 55, except not adding CHDC, adding 30 mol % of cyclohexane dimethanol component, and using 0.02 wt % of ordinary antimony trioxide as a condensation polymerization catalyst, to obtain a laminate film. Results are shown in Tables 6 and 7. Although refractive index of the polyester decreased, the photoelastic coefficient was slightly high, and the reflectance of the laminate film was also slightly inferior.

Comparative Example 24

A polyester was polymerized in the same way as Example 55, except without copolymerizing CHDC, copolymerizing 45 mol % of SPG, and using 0.02 wt % of ordinary antimony trioxide as a condensation polymerization catalyst, to obtain a laminate film. Results are shown in Tables 6 and 7. The polyester was very high in Tg and gel fraction, and the delamination property of the laminate film was also inferior. And, during the condensation polymerization reaction, amount of scattering of low molecular weight substance was large and vacuum pipe was clogged a little bit, to cause an insufficient degree of vacuum.

Comparative Example 25

A polyester was polymerized in the same way as Example 55, except copolymerizing 25 mol % of CHDC, not copolymerizing SPG, and using 0.02 wt % of ordinary antimony trioxide as a condensation polymerization catalyst, to obtain a laminate film. Results are shown in Tables 6 and 7. In the polyester, although the refractive index was in the aimed range, Tg decreased, and the laminate film was inferior in delamination property, and the reflectance was also low.

Comparative Example 26

A laminate film was obtained in the same way as Example 55, except adding 60 ppm as titanium element of Ti catalyst. Results are shown in Tables 6 and 7. Since the amount of titanium atom was large, gelation was very much accelerated and b value was high.

Comparative Example 27

A polymerization was carried out in the same way as Example 55 except adding 0.4 ppm as titanium element of titanium catalyst, but as shown in Tables 6 and 7, since the amount of titanium atom was very low, the polymerization time was delayed and, as a result, a polymer of predetermined degree of polymerization could not be obtained.

Comparative Example 28

A laminate film was obtained in the same way as Example 55, except changing the amount of phosphorus compound to be used for the kneading to 1.50 wt %. Results are shown in Tables 6 and 7. The amount of phosphorus in the polyester after the kneading became very high as 1100 ppm, and although gel fraction became very low, it was impossible to obtain other than a film having a high haze as 5.5%.

Comparative Example 29

A polymerization was carried out in the same way as Example 55, except adding 1.50 wt % of PEP36 before the condensation polymerization reaction, but as shown in Tables 6 and 7, Ti catalyst was deactivated, and it was impossible to obtain a polyester of predetermined degree of polymerization.

TABLES 6

| | Composition of polyester resin composition | | | | | |
|---|---|---|---|---|---|---|
| | Dicarboxylic acid component | | | Diol component | | Mole number of aromatic ring |
| | Kind/(mol %) | Kind/(mol %) | Trans form (%) | Kind/(mol %) | Kind/(mol %) | (mol/kg) |
| Example 55 | TPA/80 | CHDA/20 | 25 | EG/85 | SPG/15 | 3.48 |
| Example 56 | TPA/80 | CHDA/20 | 25 | EG/85 | SPG/15 | 3.48 |
| Example 57 | TPA/80 | CHDA/20 | 25 | EG/85 | SPG/15 | 3.48 |
| Example 58 | TPA/95 | CHDA/5 | 25 | EG/97 | SPG/5 | 4.76 |
| Example 59 | TPA/40 | CHDA/60 | 25 | EG/40 | SPG/60 | 1.17 |
| Example 60 | TPA/80 | CHDA/20 | 25 | EG/85 | SPG/15 | 3.48 |
| Example 61 | TPA/80 | CHDA/20 | 25 | EG/85 | SPG/15 | 3.48 |
| Example 62 | TPA/80 | CHDA/20 | 25 | EG/85 | SPG/15 | 3.48 |
| Example 63 | TPA/80 | CHDA/20 | 25 | EG/85 | SPG/15 | 3.48 |
| Example 64 | TPA/80 | CHDA/20 | 40 | EG/85 | SPG/15 | 3.48 |
| Example 65 | TPA/75 | DDA/25 | — | EG/85 | SPG/15 | 3.42 |
| Example 66 | TPA/80 | CHDA/20 | — | EG/90 | ISB/10 | 3.48 |
| Comp. example 22 | TPA/85 | IPA/15 | — | EG/100 | — | 5.20 |
| Comp. example 23 | TPA/100 | — | — | EG/70 | CHDM/30 | 4.61 |
| Comp. example 24 | TPA/100 | — | — | EG/55 | SPG/45 | 3.32 |
| Comp. example 25 | TPA/75 | CHDA/25 | 25 | EG/100 | — | 3.87 |
| Comp. example 26 | TPA/80 | CHDA/20 | 25 | EG/85 | SPG/15 | 3.48 |
| Comp. example 27 | TPA/80 | CHDA/20 | 25 | EG/85 | SPG/15 | 3.48 |
| Comp. example 28 | TPA/80 | CHDA/20 | 25 | EG/85 | SPG/15 | 3.48 |
| Comp. example 29 | TPA/80 | CHDA/20 | 25 | EG/85 | SPG/15 | 3.48 |

TABLES 6-continued

| | Composition of polyester resin composition | | | | | | |
|---|---|---|---|---|---|---|---|
| | Kind of condensation polymerization catalyst | Ti atom (ppm) | Phosphorus compound 1 | | Phosphorus compound 2 | | Inherent viscosity |
| | | | Kind | Amount of addition (wt %) | Kind | Amount of addition (wt %) | |
| Example 55 | Ti catalyst A | 20 | TEPA | 0.02 (P: 28 ppm) | PEP36 | 0.15 (P: 147 ppm) | 0.72 |
| Example 56 | Ti catalyst B | 20 | TEPA | 0.02 (P: 28 ppm) | PEP36 | 0.15 (P: 147 ppm) | 0.73 |
| Example 57 | Ti catalyst C | 20 | TEPA | 0.02 (P: 28 ppm) | PEP36 | 0.15 (P: 147 ppm) | 0.72 |
| Example 58 | Ti catalyst A | 20 | TEPA | 0.02 (P: 28 ppm) | PEP36 | 0.15 (P: 147 ppm) | 0.72 |
| Example 59 | Ti catalyst A | 20 | TEPA | 0.02 (P: 28 ppm) | PEP36 | 0.15 (P: 147 ppm) | 0.72 |
| Example 60 | Ti catalyst A | 50 | TEPA | 0.02 (P: 28 ppm) | PEP36 | 0.15 (P: 147 ppm) | 0.72 |
| Example 61 | Ti catalyst A | 5 | TEPA | 0.02 (P: 28 ppm) | PEP36 | 0.15 (P: 147 ppm) | 0.70 |
| Example 62 | Ti catalyst A | 20 | TEPA | 0.02 (P: 28 ppm) | PEP36 | 0.05 (P: 49 ppm) | 0.72 |
| Example 63 | Ti catalyst A | 20 | TEPA | 0.02 (P: 28 ppm) | PEP36 | 0.15 (P: 147 ppm) | 0.72 |
| Example 64 | Ti catalyst A | 20 | TEPA | 0.02 (P: 28 ppm) | PEP36 | 0.15 (P: 147 ppm) | 0.72 |
| Example 65 | Ti catalyst A | 20 | TEPA | 0.02 (P: 28 ppm) | PEP36 | 0.15 (P: 147 ppm) | 0.73 |
| Example 66 | Ti catalyst A | 20 | TEPA | 0.02 (P: 28 ppm) | PEP36 | 0.15 (P: 147 ppm) | 0.69 |
| Comp. example 22 | $Sb_2O_3$ | — | TEPA | 0.02 (P: 28 ppm) | — | — | 0.72 |
| Comp. example 23 | $Sb_2O_3$ | — | TEPA | 0.02 (P: 28 ppm) | — | — | 0.72 |
| Comp. example 24 | $Sb_2O_3$ | — | TEPA | 0.02 (P: 28 ppm) | — | — | 0.72 |
| Comp. example 25 | $Sb_2O_3$ | — | TEPA | 0.02 (P: 28 ppm) | — | — | 0.72 |
| Comp. example 26 | Ti catalyst A | 60 | TEPA | 0.02 (P: 28 ppm) | — | — | 0.72 |
| Comp. example 27 | Ti catalyst A | 0.4 | TEPA | 0.02 (P: 28 ppm) | — | — | not polymerized |
| Comp. example 28 | Ti catalyst A | 20 | TEPA | 0.02 (P: 28 ppm) | — | — | 0.72 |
| Comp. example 29 | Ti catalyst A | 20 | TEPA | 0.02 (P: 28 ppm) | PEP36 | 1.50 (P: 1470 ppm) | not polymerized |

TPA: terephthalic acid component
IPA: isophthalic acid component
CHDA: cyclohexane dicarboxylic acid component
DDA: decalin dicarboxylic acid component
EG: ethylene glycol component
SPG: spiroglycol component
CHDM: cyclohexane dimethanol component
ISB: isosorbide component
TEPA: triethyl phosphonoacetate
PEP36: bis(2,6-di-tert-butyl-4-methyl phenyl) pentaerythritol-di-phosphite

TABLES 7

| | Quality of polyester resin composition after kneading with phosphorus compound | | | | |
|---|---|---|---|---|---|
| | Phosphorus compound kneaded | | Amount of addition of total | Amount of | |
| | Kind | Amount of addition (wt %) | phosphorus (ppm) | phosphorus Measured (ppm) | Tg (° C.) |
| Example 55 | PEP36 | 0.15 (P: 147 ppm) | 322 | 207 | 78 |
| Example 56 | PEP36 | 0.15 (P: 147 ppm) | 322 | 210 | 78 |
| Example 57 | PEP36 | 0.15 (P: 147 ppm) | 322 | 208 | 78 |
| Example 58 | PEP36 | 0.15 (P: 147 ppm) | 322 | 209 | 77 |
| Example 59 | PEP36 | 0.15 (P: 147 ppm) | 322 | 210 | 86 |
| Example 60 | PEP36 | 0.15 (P: 147 ppm) | 322 | 208 | 78 |
| Example 61 | PEP36 | 0.15 (P: 147 ppm) | 322 | 209 | 78 |
| Example 62 | PEP36 | 0.05 (P: 49 ppm) | 126 | 75 | 78 |
| Example 63 | PEP36 | 0.50 (P: 490 ppm) | 637 | 420 | 78 |

TABLES 7-continued

| | | | | | |
|---|---|---|---|---|---|
| Example 64 | PEP36 | 0.15 (P: 147 ppm) | 322 | 209 | 77 |
| Example 65 | PEP36 | 0.15 (P: 147 ppm) | 322 | 207 | 78 |
| Example 66 | PEP36 | 0.15 (P: 147 ppm) | 322 | 207 | 78 |
| Comp. example 22 | — | — | 28 | 20 | 78 |
| Comp. example 23 | — | — | 28 | 22 | 80 |
| Comp. example 24 | — | — | 28 | 21 | 103 |
| Comp. example 25 | — | — | 28 | 22 | 62 |
| Comp. example 26 | — | — | 28 | 22 | 78 |
| Comp. example 27 | — | — | 28 | 22 | — |
| Comp. example 28 | PEP36 | 1.50 (P: 1470 ppm) | 1498 | 1100 | 78 |
| Comp. example 29 | — | — | 1498 | 1120 | — |

| | Quality of polyester resin composition after kneading phosphorus compound | | | | | | | |
|---|---|---|---|---|---|---|---|---|
| | Heat of crystal fusion (J/g) | Refractive index | Inherent viscosity | Gel fraction under the atmosphere (%) | Color tone b value | Haze (%) | Photoelastic coefficient ($\times 10^{-12}$ Pa$^{-1}$) | Delamination property (number) | Reflectance (%) |
| Example 55 | nd | 1.550 | 0.65 | 1.0 | 10 | 1.0 | 85 | 0 | 100 |
| Example 56 | nd | 1.550 | 0.66 | 1.0 | 10 | 0.9 | 86 | 1 | 99 |
| Example 57 | nd | 1.550 | 0.65 | 2.9 | 13 | 1.5 | 85 | 1 | 98 |
| Example 58 | nd | 1.568 | 0.65 | 0.5 | 9 | 0.7 | 98 | 0 | 89 |
| Example 59 | nd | 1.520 | 0.67 | 5.0 | 12 | 3.0 | 45 | 4 | 106 |
| Example 60 | nd | 1.550 | 0.65 | 3.0 | 15 | 2.0 | 85 | 0 | 98 |
| Example 61 | nd | 1.550 | 0.66 | 0.5 | 7 | 0.8 | 85 | 0 | 98 |
| Example 62 | nd | 1.550 | 0.68 | 4.0 | 11 | 0.9 | 85 | 0 | 100 |
| Example 63 | nd | 1.550 | 0.68 | 0.5 | 10 | 1.5 | 85 | 0 | 99 |
| Example 64 | nd | 1.551 | 0.66 | 1.0 | 10 | 0.9 | 95 | 0 | 92 |
| Example 65 | nd | 1.551 | 0.65 | 1.0 | 10 | 1.5 | 78 | 2 | 98 |
| Example 66 | nd | 1.562 | 0.62 | 1.0 | 15 | 1.8 | 95 | 0 | 94 |
| Comp. example 22 | nd | 1.580 | — | 5.0 | 5 | 0.5 | 120 | 0 | 83 |
| Comp. example 23 | nd | 1.568 | — | 6.0 | 4 | 0.4 | 105 | 2 | 87 |
| Comp. example 24 | nd | 1.552 | — | 61.0 | 12 | 2.1 | 83 | 5 | 95 |
| Comp. example 25 | nd | 1.560 | — | 0.8 | 5 | 0.8 | 93 | 5 | 90 |
| Comp. example 26 | nd | 1.550 | — | 40 | 20 | 2.0 | 85 | 1 | 99 |
| Comp. example 27 | — | — | — | — | — | — | — | — | — |
| Comp. example 28 | nd | 1.550 | 0.67 | 0.1 | 7 | 5.5 | 85 | 1 | 99 |
| Comp. example 29 | — | — | — | — | — | — | — | — | — |

Tg: glass transition temperature
PEP36: bis(2,6-di-tert-butyl-4methyl phenyl) pentaerythritol-di-phosphite
nd: not detected

INDUSTRIAL APPLICABILITY

According to the present invention, it is possible to obtain a polyester resin composition of which refractive index and photoelastic coefficient are low, and thermally degraded foreign substance is prevented.

The polyester resin composition obtained by the present invention is low in photoelastic coefficient, and suitable as a film for liquid crystal display. And, the film in which a layer constituted with the polyester resin composition of the present invention and a layer constituted with PET are laminated alternatively is excellent in light reflecting properties and suitable for light reflection material applications.

The invention claimed is:

1. A laminated polyester film comprising alternate layers of a polyester resin composition and a polyethylene terephthalate resin composition, the polyester resin composition comprising a polyester resin comprising at least a cyclohexane dicarboxylic acid component and a terephthalic acid component as dicarboxylic acid components, and at least a spiroglycol component and an ethylene glycol component as alicyclic diol components, wherein said polyester resin composition comprises 5 to 80 mol % of the cyclohexane dicarboxylic acid component and 20 to 95 mol % of the terephthalic acid component in all dicarboxylic acid components used to prepare the polyester resin composition, and 5 to 80 mol % of the spiroglycol component and 20 to 95 mol % of the ethylene glycol component in all diol components used to prepare the polyester resin composition, such that the polyester resin composition is substantially amorphous and satisfies the following equations (1) to (5):

$$70°\,C. \leq \text{glass transition temperature} \leq 87°\,C. \quad (1)$$

$$1.510 \leq \text{refractive index at sodium D line} \leq 1.560 \quad (2)$$

$$5 \leq \text{titanium element content} \leq 500 \text{ ppm} \quad (3)$$

$$50 \leq \text{phosphorus element content} \leq 500 \text{ ppm and} \quad (4)$$

$$\text{gel fraction} \leq 50\% \quad (5)$$

wherein the gel fraction is a ratio of o-chlorophenol insoluble component weight with respect to total weight after the polyester resin composition is heat treated in a condition under an atmosphere of 285° C. for 2.5 hours, wherein a light reflectance of the laminated polyester film is 90% or more.

2. The laminate polyester film according to claim 1, which comprises a titanium compound comprising at least one kind of substituent selected from the group consisting of alkoxy group, phenoxy group, acylate group, amino group and hydroxyl group.

3. The laminate polyester film according to claim 2, wherein the substituent of the titanium compound is at least one kind functional group selected from the group consisting of a β-diketone-based functional group, a hydroxycarboxylic acid-based functional group and a ketoester-based functional group.

4. The laminate polyester film according to claim 1, which comprises cis form and trans form as the cyclohexane dicarboxylic acid component and 40% or less of the total cyclohexane dicarboxylic acid component is the trans form.

5. The laminate polyester film according to claim 1, wherein a mole number of aromatic ring contained in the polyester resin is 4.8 mol or less per polyester resin 1 kg.

6. A production method of the laminate polyester film of claim 1, comprising providing at least the cyclohexane dicarboxylic acid component and the alicyclic diol components, adding a titanium compound such that an amount of titanium element is 5 ppm or more and 500 ppm or less with respect to the polyester resin composition to be obtained, and further adding a phosphorus compound such that an amount of phosphorus element is 50 ppm or more and 500 ppm or less with respect to the polyester resin composition to be obtained.

7. The production method of claim 6, wherein the titanium element content is 5 ppm or more and 100 ppm or less, and in addition, the phosphorus element content is 70 ppm or more and 300 ppm or less.

8. A laminated polyester film according to claim 1, wherein the polyester resin composition further satisfies the following equation (6):

$$\text{photoelastic coefficient} < 100 \times 10^{-12} \text{ Pa}^{-1}. \tag{6}$$

9. The film of claim 1, wherein the laminate polyester film has a laminate polyester film has at least 101 layers.

* * * * *